US012810503B2

(12) United States Patent
Xiong et al.

(10) Patent No.: US 12,810,503 B2
(45) Date of Patent: Nov. 24, 2026

(54) REGISTRATION AND PARALLAX ERROR CORRECTION FOR VIDEO SEE-THROUGH (VST) EXTENDED REALITY (XR)

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 18/787,834

(22) Filed: Jul. 29, 2024

(65) Prior Publication Data

US 2025/0272894 A1 Aug. 28, 2025

Related U.S. Application Data

(60) Provisional application No. 63/559,143, filed on Feb. 28, 2024.

(51) Int. Cl.
*G06T 11/60* (2026.01)
*G06T 7/80* (2017.01)

(52) U.S. Cl.
CPC ................ *G06T 11/60* (2013.01); *G06T 7/80* (2017.01)

(58) Field of Classification Search
CPC .................................. G06T 7/80; G06T 11/60
See application file for complete search history.

(56) References Cited

U.S. PATENT DOCUMENTS 10,198,865 B2 2/2019 Kezele et al.
10,623,453 B2 4/2020 Souchard
(Continued)

FOREIGN PATENT DOCUMENTS

KR 102292537 B1 8/2021
KR 102501663 B1 2/2023
KR 20240013625 A 1/2024

OTHER PUBLICATIONS

Yang et al. (Oct. 9, 2023). "A Global Correction Framework for Camera Registration in Video See-Through Augmented Reality Systems." ASME. J. Comput. Inf. Sci. Eng. Mar. 2024; 24(3): 031003. https://doi.org/10.1115/1.4063350 (Year: 2023).*
(Continued)

*Primary Examiner* — Daniel F Hajnik
*Assistant Examiner* — Jed-Justin Imperial

(57) ABSTRACT

A method includes identifying a transformation associated with a video see-through (VST) extended reality (XR) device using registration and parallax errors. The registration and parallax errors are based on one or more differences between (i) one or more actual positions of contents of a scene as imaged using a see-through camera and (ii) one or more perceived positions of the contents of the scene at a virtual camera associated with a viewpoint of a user when viewing a display panel. The method also includes obtaining an image that captures an object using the see-through camera, applying the transformation to the image in order to generate a modified image, and rendering the modified image for presentation on the display panel. Applying the transformation modifies the image such that a perceived position of the object substantially matches an actual position of the object when the display panel is viewed by the user.

20 Claims, 13 Drawing Sheets

(56) References Cited

U.S. PATENT DOCUMENTS

| | | | |
|---|---|---|---|
| 2019/0206119 A1 | 7/2019 | Nam et al. | |
| 2019/0208181 A1 | 7/2019 | Rowell et al. | |
| 2021/0350623 A1 | 11/2021 | Robaina et al. | |
| 2022/0004765 A1 | 1/2022 | Lin et al. | |
| 2022/0028095 A1* | 1/2022 | Bleyer | G06T 19/006 |
| 2022/0392109 A1 | 12/2022 | Forutanpour et al. | |
| 2023/0117368 A1 | 4/2023 | Siddiqui | |
| 2023/0179753 A1 | 6/2023 | Leighton | |
| 2023/0196673 A1 | 6/2023 | Yun et al. | |
| 2023/0237703 A1 | 7/2023 | Ma | |
| 2023/0239574 A1 | 7/2023 | Dzitsiuk et al. | |

OTHER PUBLICATIONS

International Search Report and Written Opinion of the International Searching Authority dated Feb. 16, 2025 in connection with International Patent Application No. PCT/KR2024/017329, 8 pages.

* cited by examiner

REGISTRATION AND PARALLAX ERROR CORRECTION FOR VIDEO SEE-THROUGH (VST) EXTENDED REALITY (XR)

CROSS-REFERENCE TO RELATED APPLICATION AND PRIORITY CLAIM

This application claims priority under 35 U.S.C. § 119 (e) to U.S. Provisional Patent Application No. 63/559,143 filed on Feb. 28, 2024. This provisional patent application is hereby incorporated by reference in its entirety.

TECHNICAL FIELD

This disclosure relates generally to extended reality (XR) systems and processes. More specifically, this disclosure relates to registration and parallax error correction for video see-through (VST) XR.

BACKGROUND

Extended reality (XR) systems are becoming more and more popular over time, and numerous applications have been and are being developed for XR systems. Some XR systems (such as augmented reality or “AR” systems and mixed reality or “MR” systems) can enhance a user’s view of his or her current environment by overlaying digital content (such as information or virtual objects) over the user’s view of the current environment. For example, some XR systems can often seamlessly blend virtual objects generated by computer graphics with real-world scenes.

SUMMARY

This disclosure relates to registration and parallax error correction for video see-through (VST) extended reality (XR).

In a first embodiment, a method includes identifying a transformation associated with a VST XR device using a registration error and a parallax error. The registration error and the parallax error are based on one or more differences between (i) one or more actual positions of contents of a scene as imaged using a see-through camera of the VST XR device and (ii) one or more perceived positions of the contents of the scene at a virtual camera associated with a viewpoint of a user when viewing a display panel of the VST device. The method also includes obtaining an image that captures an object using the see-through camera, applying the transformation to the image in order to generate a modified image, and rendering the modified image for presentation on the display panel. Applying the transformation modifies the image such that a perceived position of the object substantially matches an actual position of the object when the display panel is viewed by the user.

In a second embodiment, a VST XR device includes a see-through camera, a display panel, and at least one processing device. The at least one processing device is configured to identify a transformation using a registration error and a parallax error. The registration error and the parallax error are based on one or more differences between (i) one or more actual positions of contents of a scene as imaged using the see-through camera and (ii) one or more perceived positions of the contents of the scene at a virtual camera associated with a viewpoint of a user when viewing the display panel. The at least one processing device is also configured to obtain an image that captures an object using the see-through camera, apply the transformation to the image in order to generate a modified image, and render the modified image for presentation on the display panel. The at least one processing device is configured to apply the transformation in order to modify the image such that a perceived position of the object substantially matches an actual position of the object when the display panel is viewed by the user.

In a third embodiment, a non-transitory machine readable medium contains instructions that when executed cause at least one processor of a VST XR device to identify a transformation using a registration error and a parallax error. The registration error and the parallax error are based on one or more differences between (i) one or more actual positions of contents of a scene as imaged using a see-through camera of the VST XR device and (ii) one or more perceived positions of the contents of the scene at a virtual camera associated with a viewpoint of a user when viewing a display panel of the VST device. The non-transitory machine readable medium also contains instructions that when executed cause the at least one processor to obtain an image that captures an object using the see-through camera, apply the transformation to the image in order to generate a modified image, and render the modified image for presentation on the display panel. The instructions when executed cause the at least one processor to apply the transformation in order to modify the image such that a perceived position of the object substantially matches an actual position of the object when the display panel is viewed by the user.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
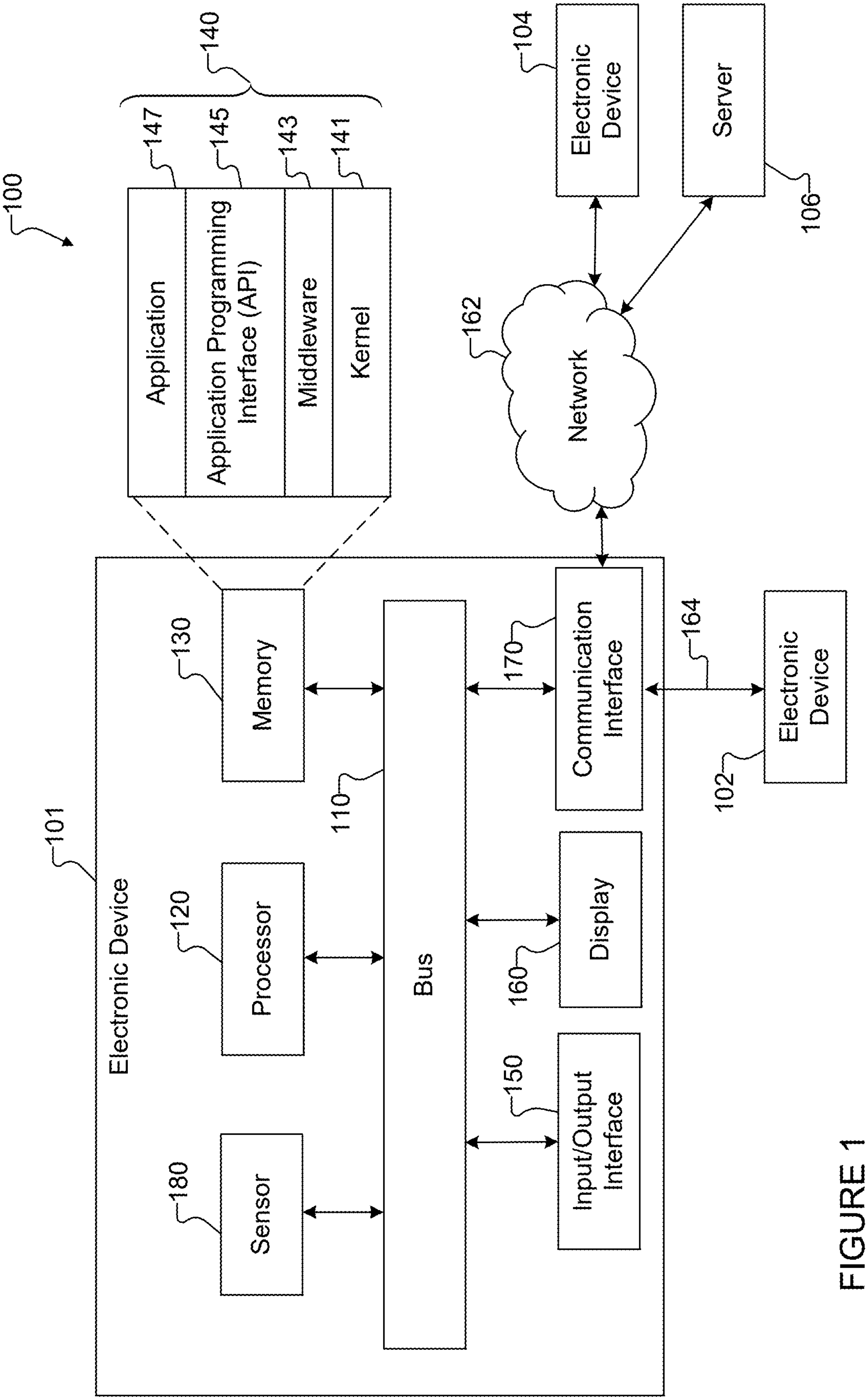
FIG. 1 illustrates an example network configuration including an electronic device in accordance with this disclosure.

FIGS. 1 through 15, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

VST XR devices typically use see-through cameras to capture images of their surrounding environments. The see-through cameras of a VST XR device are positioned at locations away from a user's eyes, so images of a scene cannot be captured at the locations of the user's eyes. As a result, the images (if presented to the user directly) would provide views of the scene that are different from the views at the user's eyes. Among other things, this can result in mis-registration between objects in the scene as perceived at the user's eyes and the same objects in the scene as captured in the images. Parallax differences can also exist since the viewpoints at the user's eyes are different from the viewpoints at the see-through cameras. Registration and parallax errors in images presented to users may cause the users to feel uncomfortable or even experience motion sickness.

This disclosure provides various techniques supporting registration and parallax error correction for VST XR. As described in more detail below, a transformation associated with a VST XR device can be identified using a registration error and a parallax error. The registration error and the parallax error can be based on one or more differences between (i) one or more actual positions of contents of a scene as imaged using a see-through camera of the VST XR device and (ii) one or more perceived positions of the contents of the scene at a virtual camera associated with a viewpoint of a user when viewing a display panel of the VST device. An image that captures an object can be obtained using the see-through camera, and the transformation can be applied to the image in order to generate a modified image. The modified image can be rendered for presentation on the display panel. By applying the transformation, the image can be modified such that a perceived position of the object substantially matches an actual position of the object when the display panel is viewed by the user. Any suitable number of images may be received and processed in this manner, such as by receiving and processing sequences of images from left and right see-through cameras.

In this way, these techniques can be used to efficiently and effectively reduce or eliminate registration and parallax errors in final views of a scene presented to a user of a VST XR device. For example, these techniques allow rendered images presented to a user to appear as if they were captured using see-through cameras located at the positions of the user's eyes, even though the see-through cameras are physically located elsewhere. The overall result is that the final views of the scene can have a higher quality, which can increase user satisfaction and reduce or avoid problems like user discomfort or motion sickness.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to registration and parallax error correction for VST XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform registration and parallax error correction for VST XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include cameras or other imaging sensors, which may be used to capture images of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to registration and parallax error correction for VST XR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
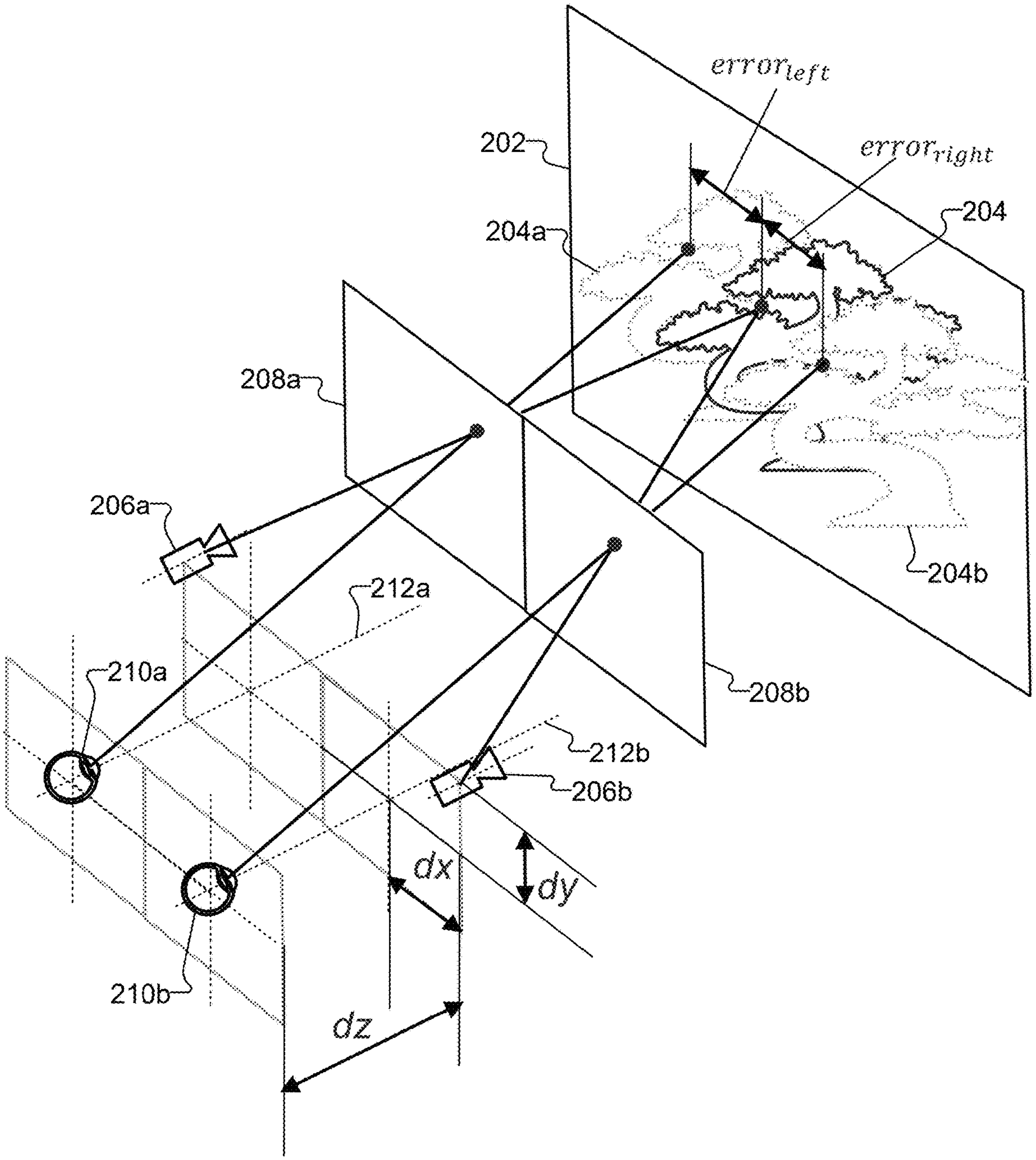
FIGS. 2A and 2B illustrate example errors and corrections associated with a video see-through (VST) extended reality (XR) device in accordance with this disclosure.
Figure 2B:
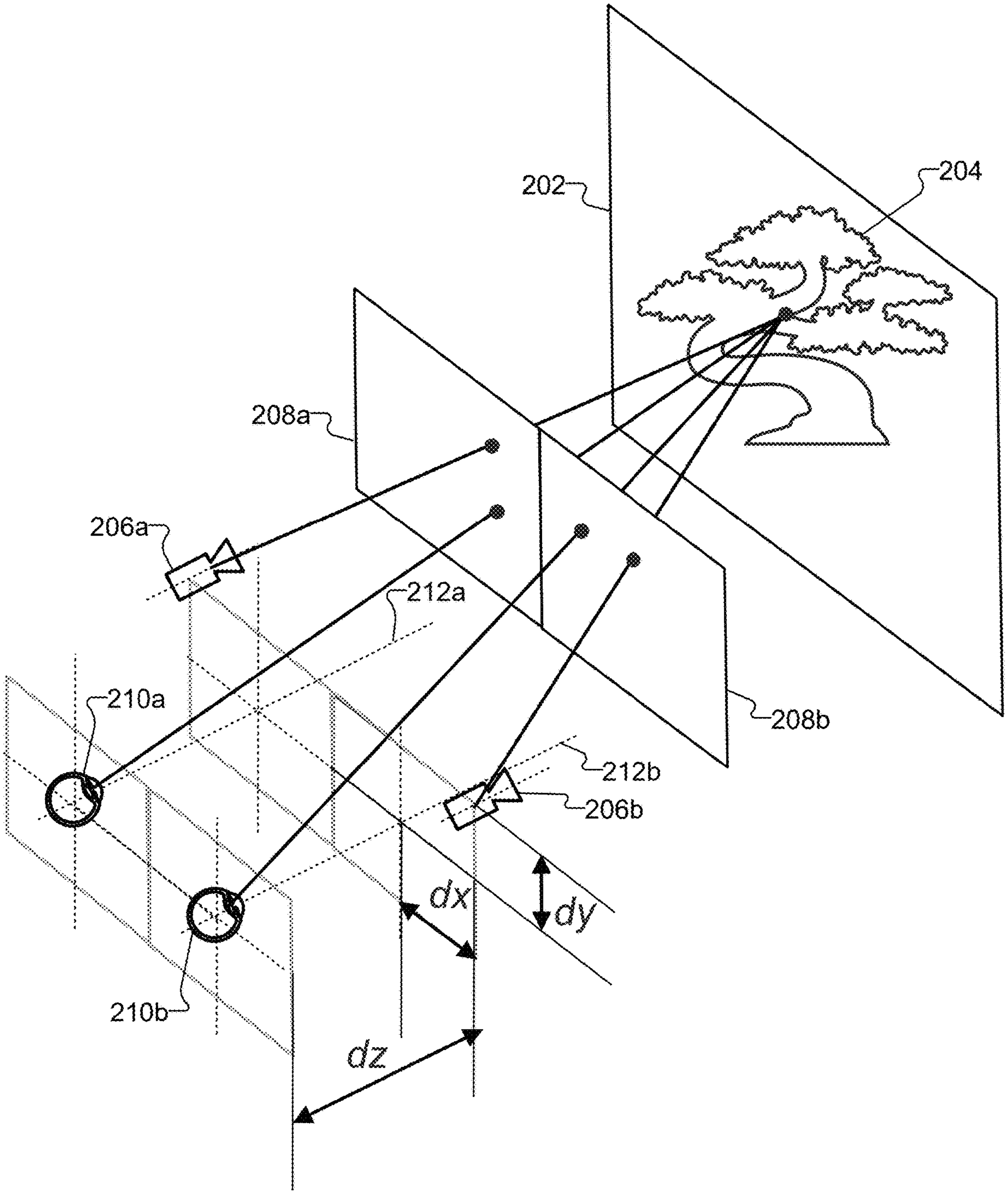

FIGS. 2A and 2B illustrate example errors and corrections associated with a VST XR device in accordance with this disclosure. For ease of illustration, the VST XR device is described as being implemented using the electronic device 101 in the network configuration 100. However, the errors and corrections shown in FIGS. 2A and 2B may be associated used with any other suitable device(s) and in any other suitable system(s).

As shown in FIG. 2A, a scene 202 is being imaged and includes at least one object 204 (a tree in this example). Here, the scene 202 is depicted as being on a plane, which indicates that the scene is being imaged at a constant depth. Note, however, that this is not required, such as when the scene 202 can be imaged at various depths. In this example, the VST XR device includes left and right see-through cameras 206*a*-206*b*, which can be used to capture images of the scene 202. The see-through cameras 206*a*-206*b* may, for example, represent different imaging sensors 180 of the electronic device 101. Each of the see-through cameras 206*a*-206*b* can be used to capture see-through images, which represent images that capture a 3D scene from the perspective of that see-through camera 206*a*-206*b*.

Images are generated and rendered by the VST XR device for presentation on display panels 208*a*-208*b* of the VST XR device. The display panels 208*a*-208*b* may, for example, represent one or more displays 160 of the electronic device 101. The display panels 208*a*-208*b* may represent separate displays 160 or different portions of the same display 160. The rendered images are viewable by the user's eyes 210*a*-210*b*. As can be seen here, the see-through camera 206*a*-206*b* are not located at the positions of the user's eyes 210*a*-210*b*. Instead, the see-through camera 206*a*-206*b* may be positioned outward or inward of optical axes 212*a*-212*b* at a distance denoted dx, above or below the optical axes 212*a*-212*b* at a distance denoted dy, and/or ahead of the user's eyes 210*a*-210*b* at a distance denoted dz. Note that while the see-through camera 206*a*-206*b* are displaced from the user's eyes 210*a*-210*b* by all three distances dx, dy, and dz in FIG. 2A, the see-through camera 206*a*-206*b* may be displaced from the user's eyes 210*a*-210*b* by one or two of these distances.

As noted above, the different positions of the see-through cameras 206*a*-206*b* and the user's eyes 210*a*-210*b* can create registration errors and/or parallax errors. For example, a point on the object 204 in FIG. 2 may appear to the user's eye 210*a* as being farther to the left than desired by a distance $error_{left}$, and the same point on the object 204 in FIG. 2 may appear to the user's eye 210*b* as being farther to the right than desired by a distance $error_{right}$. These distances $error_{left}$ and $error_{right}$ are exaggerated for ease of illustration here, but this does illustrate a problem. Registration errors and/or parallax errors can lead to the appearance of two versions 204*a*-204*b* of the object 204, where those versions 204*a*-204*b* of the object 204 do not overlap. Thus, the user visually sees two different instances of the same object 204.

The techniques described below can be used to adjust the images that are presented on the display panels 208*a*-208*b* in order to reduce or eliminate registration errors and/or parallax errors. As a result, these techniques can be used to achieve the results shown in FIG. 2B, where the rendered images presented on the display panels 208*a*-208*b* are adjusted so that common points of the object 204 are aligned with one another. As a result, the user sees a single version of the object 204 when viewing the display panels 208*a*-208*b*. Techniques for achieving reduction or elimination of registration errors and parallax errors are described below.

Although FIGS. 2A and 2B illustrate examples of errors and corrections associated with a VST XR device, various changes may be made to FIGS. 2A and 2B. For example, the scene being viewed and the registration and parallax errors being corrected can vary based on the circumstances.

Figure 3:
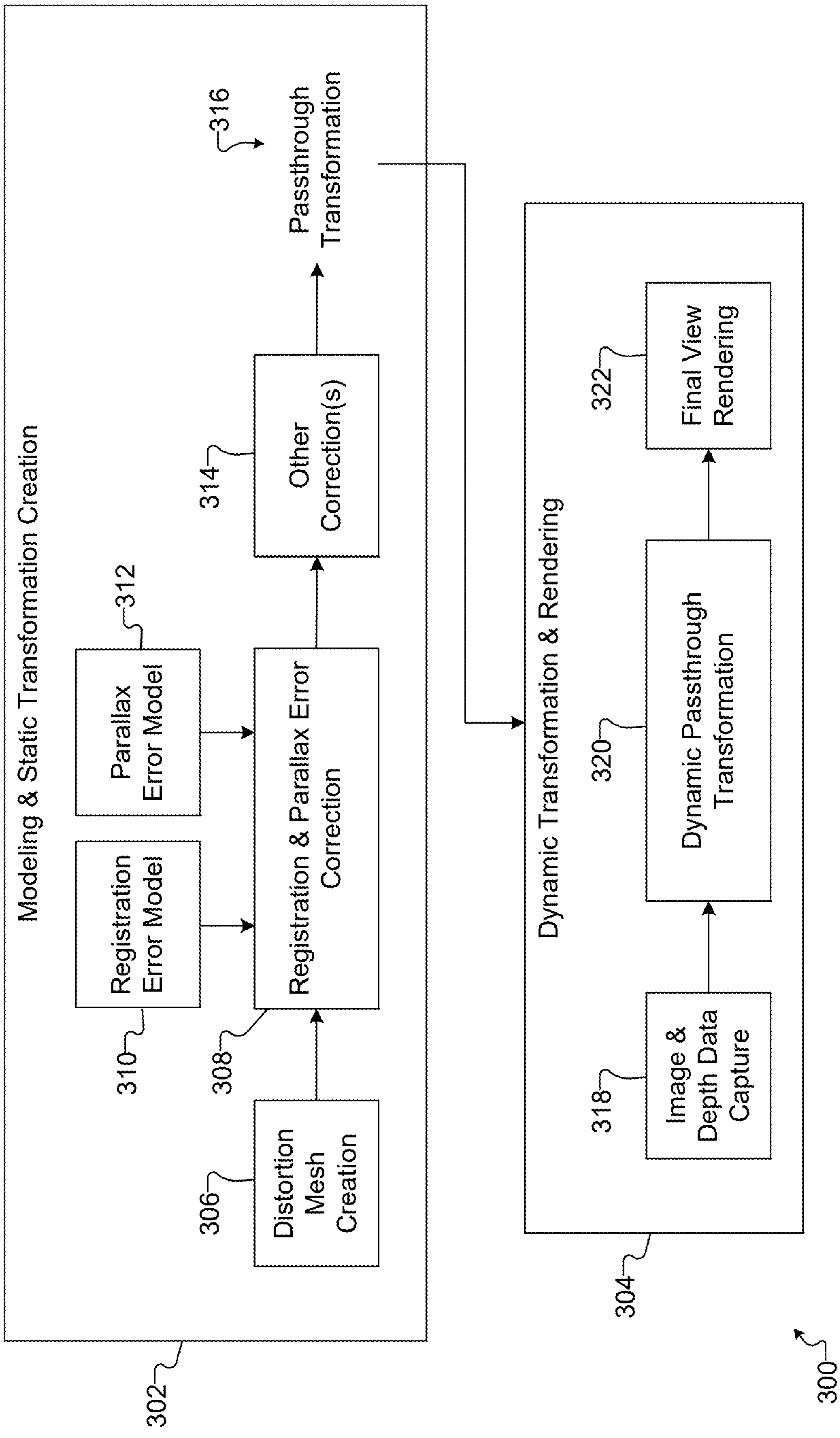
FIG. 3 illustrates a first example functional architecture supporting registration and parallax error correction for VST XR in accordance with this disclosure.

FIG. 3 illustrates a first example functional architecture 300 supporting registration and parallax error correction for VST XR in accordance with this disclosure. For ease of explanation, the architecture 300 of FIG. 3 is described as being implemented using the electronic device 101 in the network configuration 100 of FIG. 1, where the electronic device 101 represents a VST XR device having the various components shown in FIGS. 2A and 2B. However, the architecture 300 may be implemented using any other suitable device(s) and in any other suitable system(s).

As shown in FIG. 3, the architecture 300 is generally divided into two primary operations, namely a modeling and static transformation creation operation 302 and a dynamic transformation and rendering operation 304. The modeling and static transformation creation operation 302 generally operates to identify a passthrough transformation that can be used to at least correct for registration and parallax errors. The dynamic transformation and rendering operation 304 generally operates to at least apply the passthrough transformation to obtained see-through images in order to generate rendered images for presentation to a user of the VST XR device, where the rendered images have reduced or minimal registration and parallax errors. In some embodiments, the modeling and static transformation creation operation 302 can provide an efficient and potentially latency-free passthrough transformation for use in rendering the images.

In this example, the modeling and static transformation creation operation 302 includes a distortion mesh creation function 306, which generally operates to create a distortion mesh to be used to warp captured images. A distortion mesh represents a mesh of points that defines how images can be transformed or distorted to correct for various issues. In this example, the distortion mesh creation function 306 can be used to create an initial distortion mesh, which can be subsequently modified by the modeling and static transformation creation operation 302. The distortion mesh creation function 306 can use any suitable technique to generate distortion meshes.

In some cases, the distortion mesh creation function 306 may create an initial distortion mesh based on one or more extrinsic parameters of at least one see-through camera 206*a*-206*b*, one or more extrinsic parameters of at least one display panel 208*a*-208*b*, and one or more extrinsic parameters of at least one virtual camera. A virtual camera refers to an imaginary camera positioned at the location of one of the user's eyes 210*a*-210*b*, so two virtual cameras can be defined for the user's two eyes 210*a*-210*b*. In some embodiments, there may be two distortion meshes created (one for the see-through camera 206*a*, display panel 208*a*, and left virtual camera and another for the see-through camera 206*b*, display panel 208*b*, and right virtual camera), and each distortion mesh may be used as discussed below. As a particular example, each initial distortion mesh may be based on one or more positions of one or more see-through cameras 206*a*-206*b*, one or more positions of one or more display panels 208*a*-208*b*, and one or more expected positions of one or more of the user's eyes 210*a*-210*b*. Note that these parameters typically do not change as long as the geometric configuration of the VST XR device does not change. Some VST XR devices may, for example, allow modifications to the positions of certain components to support different inter-pupillary distances, which refer to the distance between the user's eyes 210*a*-210*b*. Thus, for instance, as long as the inter-pupillary distance remains constant, there may be no need to recompute the initial distortion mesh(es). However, upon a change in the inter-pupillary distance, the distortion mesh creation function 306 may generate one or more new initial distortion meshes for the current configuration of the VST XR device.

A registration and parallax error correction function 308 generally operates to transform each initial distortion mesh to correct for various issues within a VST XR device, including registration and parallax errors. For example, the registration and parallax error correction function 308 may determine how captured images would need to be modified in order to correct for possible registration and parallax errors, and the registration and parallax error correction function 308 can modify each initial distortion mesh in order to compensate for the associated registration and parallax errors. As noted above, the user's eyes 210*a*-210*b* may be associated with virtual cameras, and the registration and parallax error correction function 308 may be used to modify each initial distortion mesh based on an estimated/expected registration error and an estimated/expected parallax error. The registration and parallax errors are based on one or more differences between (i) one or more actual positions of contents of a scene as imaged using the see-through camera(s) 206*a*-206*b* of the VST XR device and (ii) one or more perceived positions of the contents of the scene at the virtual camera(s) associated with the viewpoint(s) of the user's eye(s) 210*a*-210*b* when viewing the display panel(s) 208*a*-208*b*. The registration and parallax error correction function 308 therefore operates to generate a transformation that can correct for the registration and parallax errors.

In this example, the registration and parallax error correction function 308 includes or has access to a registration error model 310 and a parallax error model 312. The registration error model 310 generally represents a mathematical model or other model that captures how registration errors may be created between (i) a scene as captured using one or more of the see-through cameras 206*a*-206*b* and (ii) a scene as viewed by one or more of the user's eyes 210*a*-210*b* (meaning a scene that would be captured using one or more virtual cameras at the position(s) of the user's eye(s) 210*a*-210*b*). Similarly, the parallax error model 312 generally represents a mathematical model or other model that captures how parallax errors may be created between (i) the scene as captured using one or more of the see-through cameras 206*a*-206*b* and (ii) the scene as viewed by one or more of the user's eyes 210*a*-210*b*. The registration error model 310 and the parallax error model 312 can therefore be used to estimate what the registration and parallax errors would be based on the actual current configuration of the VST XR device and how those errors can be reduced or minimized.

The registration and parallax error correction function 308 here modifies each initial distortion mesh and generates a corresponding modified distortion mesh. Each modified distortion mesh may optionally be processed using one or more other correction functions 314, which can further modify the modified distortion mesh in order to correct for other issues. For example, the one or more other correction functions 314 can be used to perform camera undistortion, correct for display lens geometric distortion, and correct for chromatic aberration.

With respect to camera undistortion, a see-through camera 206*a*-206*b* or other imaging sensor 180 typically includes at least one lens, and the at least one lens can create radial, tangential, or other type(s) of distortion(s) in captured images. A correction function 314 may make adjustments to each distortion mesh so that the resulting distortion mesh substantially corrects for the radial, tangential, or other type(s) of distortion(s). In some cases, the correction function 314 may include or have access to a camera matrix and lens distortion model, which can be used to identify how each distortion mesh should be adjusted so that the resulting distortion mesh substantially corrects for the camera lens distortion(s). A camera matrix is often defined as a three-by-three matrix that includes two focal lengths in the x and y directions and the principal point of the camera defined using x and y coordinates. A lens distortion model is often defined as a mathematical model that indicates how images can be undistorted, which can be derived based on the specific lens or other optical component(s) being used.

With respect to display lens geometric distortion correction (GDC) and chromatic aberration correction (CAC), rendered images presented on one or more displays 160 are often viewed by the user through left and right display lenses positioned between the user's eyes 210*a*-210*b* and the display panels 208*a*-208*b*. However, the display lenses may create geometric distortions when displayed images are viewed, and the display lenses may create chromatic aberrations when light passes through the display lenses. One or more correction functions 314 generally operate to make adjustments to each distortion mesh so that the resulting distortion mesh compensates for the geometric distortions and the chromatic aberrations. Thus, for instance, the correction function(s) 314 may determine how images should be pre-distorted to compensate for the subsequent geometric distortions and chromatic aberrations created when the images are displayed and viewed through the display lenses. In some cases, the correction function(s) 314 may operate based on a display lens GDC and CAC model, which can mathematically represent the geometric distortions and chromatic aberrations created by the display lenses.

Each resulting distortion mesh generated using the modeling and static transformation creation operation 302 represents a passthrough transformation 316. Each passthrough transformation 316 represents or is based on a final distortion mesh and is configured to correct for registration and parallax errors and other issues. Each passthrough transformation 316 can be stored (such as in a memory 130) and provided to the dynamic transformation and rendering operation 304 when needed.

In some cases, each passthrough transformation 316 may be defined ahead of time, stored, and applied when see-through image capture starts, such as when each passthrough transformation 316 is generated during an initialization of a VST XR device. In other cases, each passthrough transformation 316 may be defined at the start of see-through image capture, and the same passthrough transformation(s) 316 can be applied throughout see-through image capture. This is because the specific configuration of the VST XR device can generally remain fixed during see-through image capture, so the passthrough transformation(s) 316 can be determined for that specific configuration and applied to the see-through images captured using that specific configuration. Thus, each passthrough transformation 316 may represent a static transformation that can be applied to the see-through images without requiring computational resources or associated latency to keep identifying the passthrough transformation 316 as the see-through images are being captured and processed. Moreover, since each passthrough transformation 316 can already include registration and parallax corrections and optionally other corrections, the final rendered images presented on the display panel(s) 208*a*-208*b* provide the desired registration and the desired parallax. Note, however, that the passthrough transformations 316 can be easily reidentified as needed or desired using the approaches described here, such as if the positions and/or angles of the see-through cameras 206*a*-206*b* or other components of the VST XR device are adjusted manually or automatically during use.

The dynamic transformation and rendering operation 304 includes various functions that capture, process, and render images for presentation to the user of the VST XR device. An image and depth data capture function 318 generally operates to capture images and (optionally) depth data associated with the images for processing. For example, the image and depth data capture function 318 may obtain images captured using one or more see-through cameras 206*a*-206*b* or other imaging sensors 180. The image and depth data capture function 318 may also optionally obtain depth maps or other depth data. In some embodiments, depth maps or other depth data may be obtained using a depth sensor or other sensor(s) 180 of the VST XR device or by performing depth reconstruction in which depth values in a scene are derived based on stereo images of the scene (where disparities in locations of common points in the stereo images are used to estimate depths). As a particular example, each depth map may be generated by obtaining an initial depth map and increasing the resolution of the initial depth map using depth super-resolution and depth verification operations, which is often referred to as "densification."

A dynamic passthrough transformation function 320 generally operates to transform the captured images based on (among other things) the passthrough transformation(s) 316 and the optional depth data. For example, the dynamic passthrough transformation function 320 may apply one or more passthrough transformations 316 to the captured images in order to adjust the captured images to correct for registration and parallax errors. The dynamic passthrough transformation function 320 may also apply one or more additional transformations to the images, such as a head pose change compensation transformation. For example, there is typically a delay between capture of images and display of corresponding rendered images, and it is possible for the user to move his or her head during that intervening time period. The dynamic passthrough transformation function 320 can use information (such as from an IMU, tracking camera, or other data) to predict how the user's head pose is expected to change between capture of the images and display of the corresponding rendered images. The dynamic passthrough transformation function 320 can also apply a suitable transformation to each captured image, such as by rotating and/or translating each captured image, so that the transformed images are suitable for presentation at the user's predicted head pose. The dynamic passthrough transformation function 320 may further perform any additional color corrections or other modifications to generate transformed images.

The transformed images generated by the dynamic passthrough transformation function 320 are provided to a final view rendering function 322, which generally operates to process the transformed images and perform any additional refinements or modifications needed or desired. The resulting images can represent the final views of the scene, and the final view rendering function 322 can present rendered images of the final views to the user. For example, a 3D-to-2D warping can be used to warp the final views of the scene into 2D images. The final view rendering function 322 can render the images into a form suitable for transmission to at least one display 160 and can initiate display of the rendered images, such as by providing the rendered images to one or more displays 160.

Although FIG. 3 illustrates a first example of a functional architecture 300 supporting registration and parallax error correction for VST XR, various changes may be made to FIG. 3. For example, various components or functions in FIG. 3 may be combined, further subdivided, replicated, omitted, or rearranged and additional components or functions may be added according to particular needs.

Figure 4A:
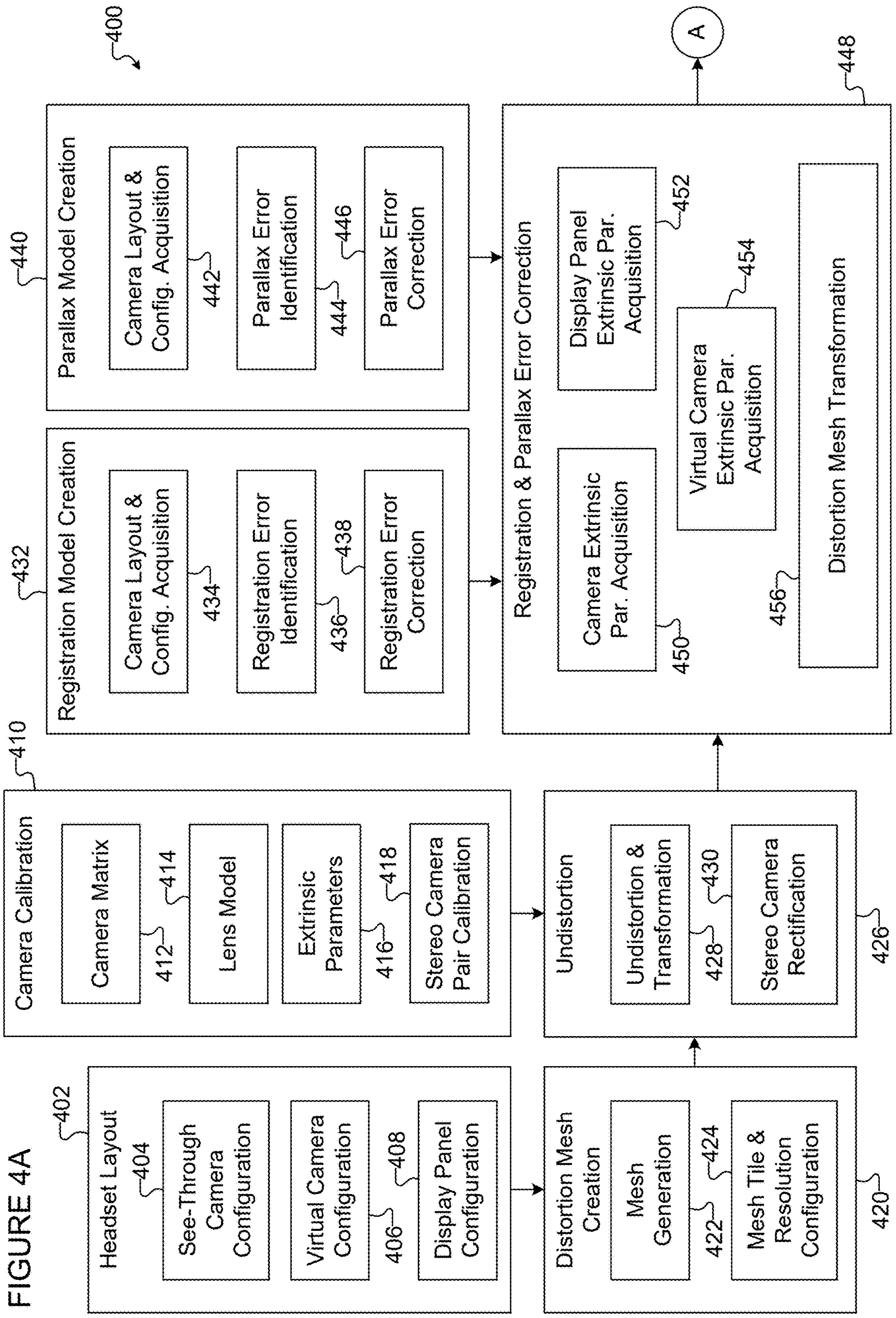
FIGS. 4A and 4B illustrate a second example functional architecture supporting registration and parallax error correction for VST XR in accordance with this disclosure.
Figure 4B:
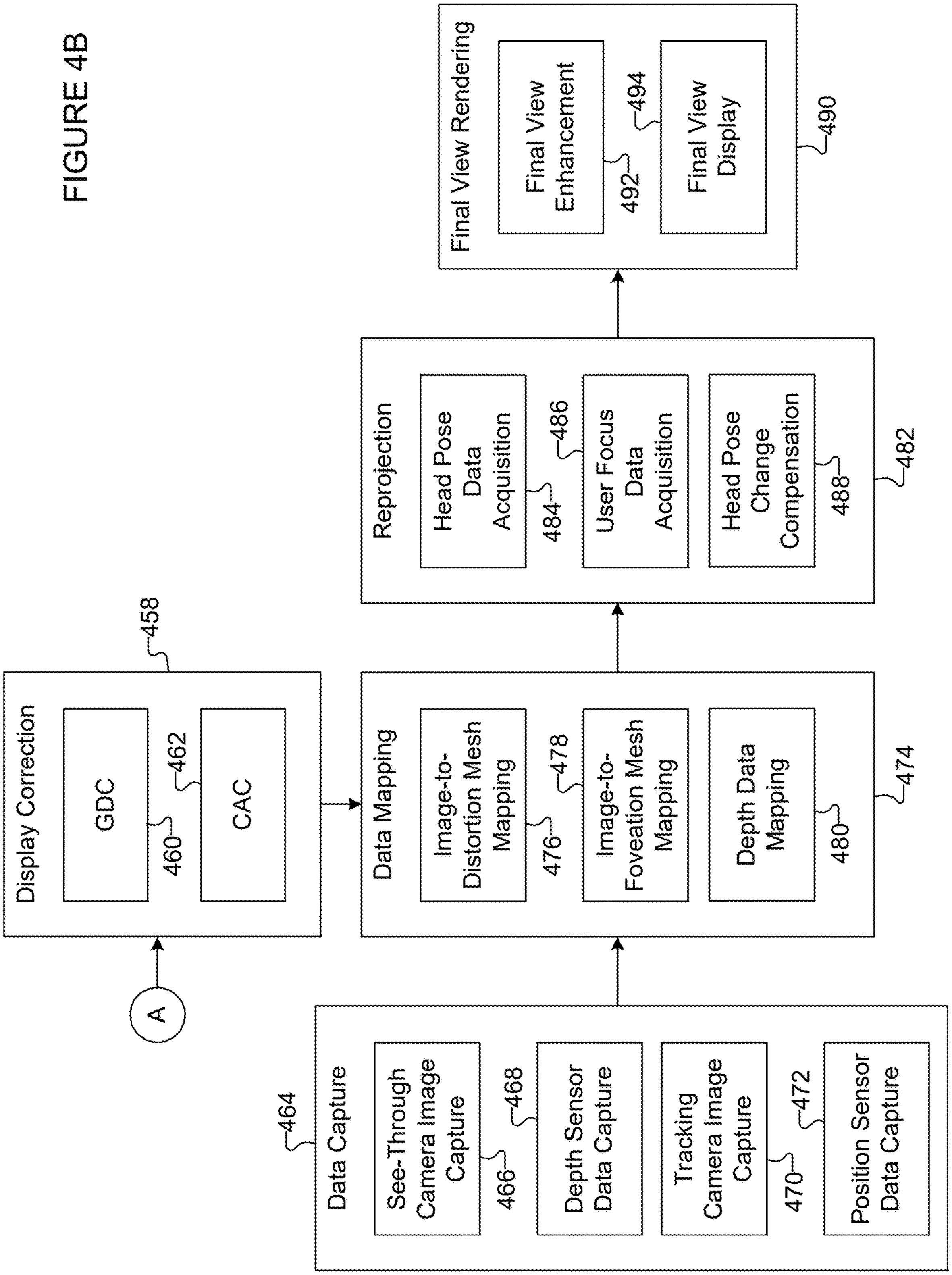

FIGS. 4A and 4B illustrate a second example functional architecture 400 supporting registration and parallax error correction for VST XR in accordance with this disclosure. For ease of explanation, the architecture 400 of FIGS. 4A and 4B is described as being implemented using the electronic device 101 in the network configuration 100 of FIG. 1, where the electronic device 101 represents a VST XR device having the various components shown in FIGS. 2A and 2B. However, the architecture 400 may be implemented using any other suitable device(s) and in any other suitable system(s).

As shown in FIG. 4A, the architecture 400 includes or has access to various types of headset layout information 402, which represents information associated with the current configuration of the VST XR device. For example, the headset layout information 402 may include see-through camera configuration data 404, virtual camera configuration data 406, and display panel configuration data 408. Among other things, the see-through camera configuration data 404 defines the location of each see-through camera 206*a*-206*b* of the VST XR device, the virtual camera configuration data 406 defines the location of each virtual camera, and the display panel configuration data 408 defines the location of each display panel 208*a*-208*b* of the VST XR device. The location of each virtual camera can be based on the actual or expected position of the associated eye 210*a*-210*b* of the user, which may be identified based on the design or current configuration of the VST XR device, the current interpupillary distance of the VST XR device, or input from one or more sensors 180.

The architecture 400 also includes or has access to various types of camera calibration information 410, which represents information associated with each see-through camera 206*a*-206*b*. For example, the camera calibration information 410 may include a camera matrix 412 for each see-through camera 206*a*-206*b*, a lens model 414 for each see-through camera 206*a*-206*b*, one or more extrinsic parameters 416 for each see-through camera 206*a*-206*b*, and stereo camera pair calibration data 418. As noted above, the camera matrix 412 for each see-through camera 206*a*-206*b* may be defined as a three-by-three matrix that includes two focal lengths of the see-through camera in the x and y directions and the principal point of the see-through camera defined using x and y coordinates. The lens model 414 for each see-through camera 206*a*-206*b* may represent a lens distortion model, which as noted above is often defined as a mathematical model that indicates how images can be undistorted (such as based on the specific lens or other optical component(s) being used in the see-through camera). The one or more extrinsic parameters 416 for each see-through camera 206*a*-206*b* relate to the location and orientation of the see-through camera, such as by identifying the translation and rotation of the see-through camera using six degrees of freedom (like three translation values along three orthogonal axes and three rotation values about the three orthogonal axes). The stereo camera pair calibration data 418 includes data related to how a stereo pair of see-through cameras 206*a*-206*b* are related to one another, such as geometrically. As described above, depth data can be derived using stereo images of a scene, where disparities in locations of common points in the stereo images are used to estimate depths. The stereo camera pair calibration data 418 provides information that allows depth data to be derived using stereo images from the stereo pair of see-through cameras 206*a*-206*b*.

A distortion mesh creation operation 420 uses the headset layout information 402 to create initial distortion meshes. For example, the distortion mesh creation operation 420 includes a mesh generation function 422, which generally operates to use the various types of headset layout information 402 to (i) determine an initial distortion mesh for transforming images captured using the see-through camera 206*a* for display on the display panel 208*a* and viewing by the user's left eye 210*a* and (ii) determine an initial distortion mesh for transforming images captured using the see-through camera 206*b* for display on the display panel 208*b* and viewing by the user's right eye 210*b*. Each initial distortion mesh here can be based on (among other things) the positions of the associated see-through camera 206*a*-206*b* and the associated display panel 208*a*-208*b* or virtual camera.

The distortion mesh creation operation 420 also includes an optional mesh tile and resolution configuration function 424. In some embodiments, the VST XR device supports foveation rendering, which refers to a process in which the area of an image receiving a user's focus has higher resolution or otherwise higher quality, while areas of the image not receiving the user's focus have lower resolution or otherwise lower quality. When foveation rendering is supported, the mesh tile and resolution configuration function 424 can identify where the user is focusing (such as based on one or more eye tracking cameras or other sensors 180), and the mesh tile and resolution configuration function 424 can identify different tiles or other portions of each initial distortion mesh and a resolution for each tile or other portion of each initial distortion mesh. For instance, the mesh tile and resolution configuration function 424 may identify one tile or other portion of each initial distortion mesh where the user is focused and assign a higher resolution to those tiles, and the mesh tile and resolution configuration function 424 may identify one or more tiles or other portions of each initial distortion mesh where the user is not focused and assign a lower resolution to those tiles.

An undistortion operation 426 uses the camera calibration information 410 to determine how captured images may need to be undistorted. As noted above, a see-through camera 206*a*-206*b* or other imaging sensor 180 typically includes at least one lens that can create radial, tangential, or other type(s) of distortion(s) in captured images. The undistortion operation 426 includes an undistortion and transformation function 428, which generally operates to process at least some of the camera calibration information 410 and adjust each initial distortion mesh from the distortion mesh creation operation 420 in order to pre-compensate for the radial, tangential, or other type(s) of distortion(s). This allows the resulting distortion meshes to substantially correct for the distortion(s) created by the camera lenses. The undistortion operation 426 also includes a stereo camera rectification function 430, which generally operates to process at least some of the camera calibration information 410 and determine how images captured using the stereo pair of see-through cameras 206*a*-206*b* should be modified in order to rectify the images. This allows the stereo camera rectification function 430 to adjust each initial distortion mesh from the distortion mesh creation operation 420 in order to ensure that images captured using the stereo pair of see-through cameras 206a-206b are suitably rectified and therefore able to be used in estimating depths within a scene.

A registration model creation operation 432 is used to generate and apply a registration error model, such as the registration error model 310. The registration model creation operation 432 includes a see-through camera layout and configuration acquisition function 434, which generally operates to obtain information about the layout and configuration of the see-through cameras 206a-206b of the VST XT device. For example, the acquisition function 434 may obtain at least some of the headset layout information 402 and the camera calibration information 410. This information can be used to identify the locations of the see-through cameras 206a-206b, such as relative to each other and/or to the associated virtual cameras at the locations of the user's eyes 210a-210b. A registration error identification function 436 determines registration errors based on the layout and configuration of the see-through cameras 206a-206b. For instance, the registration error identification function 436 can identify the registration error between each see-through camera 206a-206b and its associated virtual camera, which can be based on the geometry/current configuration of the VST XR device. A registration error correction function 438 determines how to reduce or minimize the identified registration error, such as by identifying an error correction (like a translation, a rotation, or both) that can reduce or minimize the registration error.

Similarly, a parallax model creation operation 440 is used to generate and apply a parallax error model, such as the parallax error model 312. The parallax model creation operation 440 includes a see-through camera layout and configuration acquisition function 442, which generally operates to obtain information about the layout and configuration of the see-through cameras 206a-206b of the VST XT device. For example, the acquisition function 442 may obtain at least some of the headset layout information 402 and the camera calibration information 410. This information can be used to identify the locations of the see-through cameras 206a-206b, such as relative to each other and/or to the associated virtual cameras at the locations of the user's eyes 210a-210b. Note that the acquisition function 442 may or may not represent the same function as the acquisition function 434. A parallax error identification function 444 determines parallax errors based on the layout and configuration of the see-through cameras 206a-206b. For instance, the parallax error identification function 444 can identify the parallax error between each see-through camera 206a-206b and its associated virtual camera, which can be based on the geometry/current configuration of the VST XR device. A parallax error correction function 446 determines how to reduce or minimize the identified parallax error, such as by identifying an error correction (like a translation, a rotation, or both) that can reduce or minimize the parallax error.

A registration and parallax error correction operation 448 generally operates to modify the distortion meshes from the undistortion operation 426 based on the registration error model and the parallax error model. For example, the registration and parallax error correction operation 448 includes a camera extrinsic parameter acquisition function 450, a display panel extrinsic parameter acquisition function 452, and a virtual camera extrinsic parameter acquisition function 454. The acquisition functions 450-454 obtain one or more extrinsic parameters for each of the see-through cameras 206a-206b, each of the display panels 208a-208b, and each of the virtual cameras. A distortion mesh transformation function 456 uses the acquired information to modify and apply and the error corrections determined using the registration and parallax error models. For instance, the distortion mesh transformation function 456 can use the extrinsic parameters of the see-through cameras 206a-206b, display panels 208a-208b, and virtual cameras to determine how the error corrections determined using the registration and parallax error models should be transformed so that the desired error corrections are achieved given the current configuration of the VST XR device.

As shown in FIG. 4B, the distortion meshes generated by the distortion mesh transformation function 456 are provided to a display correction operation 458, which generally operates to provide display-related corrections. For example, the display correction operation 458 includes a GDC function 460, which provides geometric distortion correction. The display correction operation 458 also includes a CAC function 462, which provides chromatic aberration correction. As noted above, these corrections may be needed when display lenses positioned between the user's eyes 210a-210b and the display panels 208a-208b create geometric distortions and chromatic aberrations. In some cases, the GDC function 460 and the CAC function 462 may each use a display lens GDC and CAC model, which can mathematically model the geometric distortions and chromatic aberrations created by the display lenses. The distortion meshes as modified by the display correction operation 458 may represent final transformed distortion meshes to be applied to captured images.

A data capture operation 464 generally operates to obtain images and related data to be processed. In this example, the data capture operation 464 includes a see-through camera image capture function 466, which generally operates to obtain images of a scene captured using one or more see-through cameras 206a-206b or other imaging sensors 180 of the VST XR device. For instance, the image capture function 466 may be used to obtain see-through images at a specified frame rate. A depth sensor data capture function 468 may be used to obtain depth maps or other depth-related data, such as from one or more depth sensors 180 of the VST XR device. A tracking camera image capture function 470 may be used to obtain tracking images from a tracking camera. A position sensor data capture function 472 may be used to obtain position-related data, such as from an IMU or other position sensor 180 of the VST XR device. The tracking images and the position-related data can relate to the head pose of the user of the VST XR device, which typically varies over time.

A data mapping operation 474 generally operates to transform the captured data from the data capture operation 464 based on (among other things) the final transformed distortion meshes from the display correction operation 458. For example, an image-to-distortion mesh mapping function 476 can map each image captured using the see-through cameras 206a-206b onto the corresponding final transformed distortion mesh. If foveation rendering is supported, an image-to-foveation mesh mapping function 478 can map each image captured using the see-through cameras 206a-206b onto the corresponding final transformed distortion mesh, where the final transformed distortion mesh supports tiles or other areas with different resolutions. A depth data mapping function 480 may map the depth maps or other depth data onto the corresponding final transformed distortion meshes. This effectively provides transformation of the captured images (and optionally other data like the depth data) based on the final transformed distortion meshes, which among other things helps to correct for registration and parallax errors.

A reprojection operation 482 generally operates to reproject the transformed images generated by the data mapping operation 474 to account for user head pose changes. As described above, there is typically a delay between capture of images and display of corresponding rendered images, and it is possible for the user to move his or her head during that intervening time period. The reprojection operation 482 includes a head pose data acquisition function 484 and a user focus data acquisition function 486. The head pose data acquisition function 484 generally operates to obtain information related to the user's head pose, such as the user's current head pose when each captured image is obtained and the user's predicted head pose when the corresponding rendered image is predicted to be displayed. The user's predicted head pose can be estimated in any suitable manner, such as by using a head pose model to estimate what the user's future head pose might be given the user's current head pose and recent movements. The user focus data acquisition function 486 generally operates to obtain information related to the user's current area of focus, which is also called the user's region of interest. A head pose change compensation function 488 generally operates to reproject each of the transformed images generated by the data mapping operation 474 (if necessary) from the head pose of the user when the corresponding original image was captured and the estimated head pose of the user when a rendered version of the transformed image will be displayed. In some cases, the head pose change compensation function 488 can apply a translation and/or a rotation to each transformed image. This can result in the generation of final views of the scene being imaged.

A final view rendering operation 490 can process the final views and perform any additional image processing functions as needed or desired. For example, a final view enhancement function 492 may perform denoising or other post-processing functions to help increase the quality of the final views. A final view display function 494 can present rendered versions of the final views to the user. For instance, the final view display function 494 can render images into a form suitable for transmission to at least one display 160 and can initiate display of the rendered images, such as by providing the rendered images to one or more displays 160.

Although FIGS. 4A and 4B illustrate a second example of a functional architecture 400 supporting registration and parallax error correction for VST XR, various changes may be made to FIGS. 4A and 4B. For example, various components or functions in FIGS. 4A and 4B may be combined, further subdivided, replicated, omitted, or rearranged and additional components or functions may be added according to particular needs. As a particular example, the registration and parallax models are described as being used to support transformations performed by the data mapping operation 474 to correct registration and parallax errors. However, the registration and parallax models may be used to support transformations performed elsewhere, such as transformations performed by the final view rendering operation 490. In other words, transformations used for registration and parallax error correction can be performed in various locations within the architecture 400. As another particular example, the architecture 400 is designed based on the assumption that the transformations for correcting registration and parallax errors are generally static. However, in other cases, the registration and parallax models can be generated using or otherwise based on depth information within a scene (which can vary dynamically), and registration and parallax correction transformations can be applied based on dynamic registration and parallax models.

Figure 5:
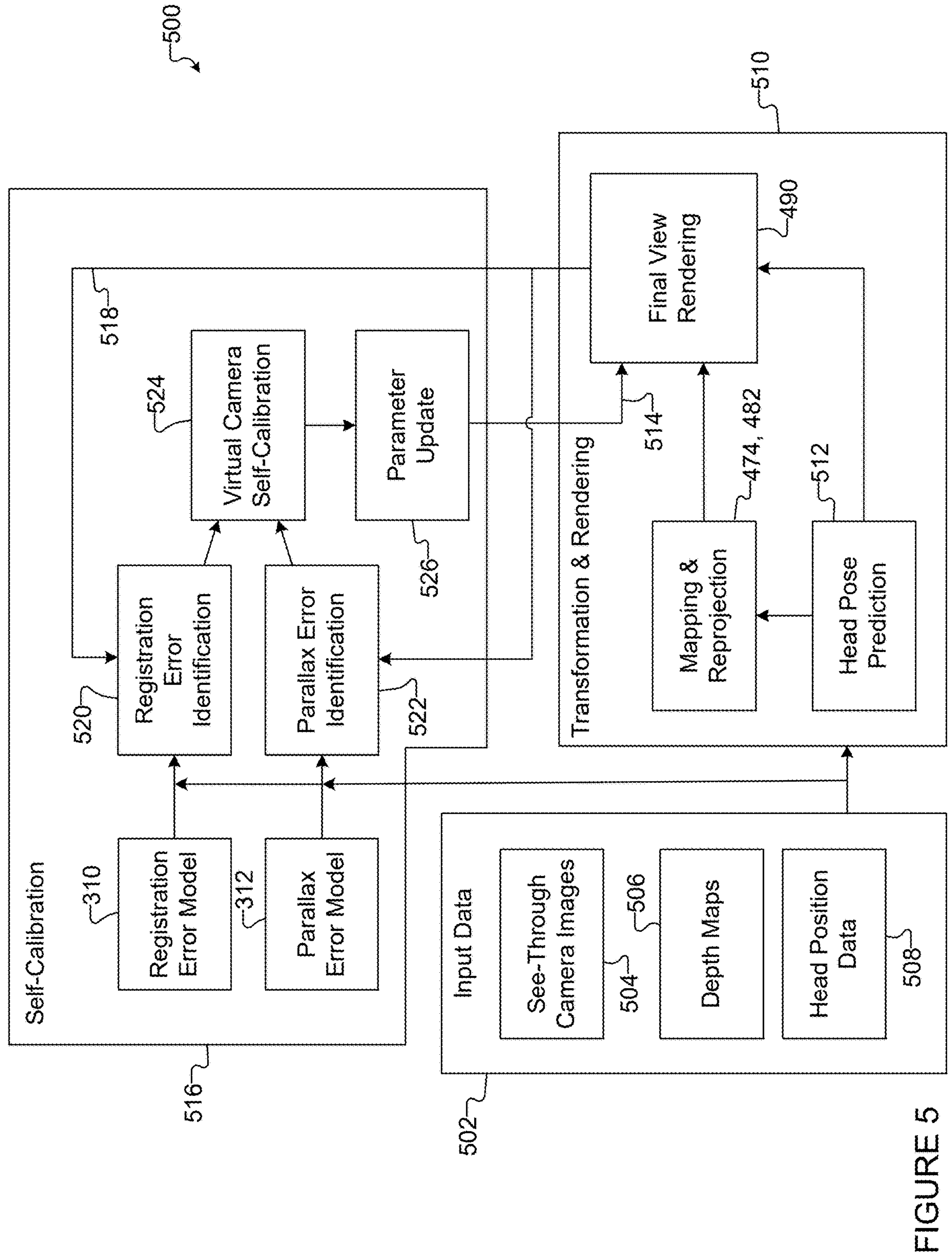
FIG. 5 illustrates an example self-calibration architecture supporting registration and parallax error correction for VST XR in accordance with this disclosure.

FIG. 5 illustrates an example self-calibration architecture 500 supporting registration and parallax error correction for VST XR in accordance with this disclosure. In some embodiments, the self-calibration architecture 500 can be used with or included in the architecture 300 or 400, such as to self-register each see-through camera 206*a*-206*b* with its associated virtual camera. As described below, this can be accomplished by integrating a registration error self-calibration and a parallax error self-calibration. This effectively allows the architecture 300 or 400 to modify rendering parameters associated with the virtual cameras based on feedback representing or associated with rendered images. In some cases, the self-calibration architecture 500 may not need to be used continuously and may be used periodically or intermittently, such as in response to a head pose change by the user of the VST device.

As shown in FIG. 5, the architecture 500 receives and processes various input data 502, such as see-through camera images 504, depth maps 506, and head position data 508. For example, the see-through camera images 504 may be obtained using the see-through camera image capture function 466, the depth maps 506 may be obtained using the depth sensor data capture function 468, and the head position data 508 may be obtained using the tracking camera image capture function 470 and the position sensor data capture function 472.

The obtained information is provided to a transformation and rendering operation 510, which generally operates to transform the captured images and render the resulting transformed images. In this example, the transformation and rendering operation 510 includes the data mapping operation 474, the reprojection operation 482, and the final view rendering operation 490 discussed above. The transformation and rendering operation 510 also includes a head pose prediction function 512, which generally operates to process the head position data 508 and make predictions about the head pose of the user. These predictions can be used by the reprojection operation 482 as discussed above to compensate for head pose changes by the user. The final view rendering operation 490 here can use rendering parameters 514 associated with the virtual cameras when rendering images for presentation to the user.

In this example, a self-calibration operation 516 can be performed using the rendered images 518 produced by the transformation and rendering operation 510, and the self-calibration operation 516 can be used to update the parameters 514 associated with the virtual cameras for use by the final view rendering operation 490. For instance, the self-calibration operation 516 includes or has access to the registration error model 310 and the parallax error model 312. A registration error identification function 520 can determine a registration error between a current see-through camera image 504 and the rendered image 518 associated with that image 504 using the registration error model 310. In some cases, the depth map 506 associated with the current see-through camera image 504 can be used when determining the registration error. This represents part of a registration error self-calibration. Similarly, a parallax registration error identification function 522 can determine a parallax error between the current see-through camera image 504 and the rendered image 518 associated with that image 504 using the parallax error model 312. In some cases, the depth map 506 associated with the current see-through camera image 504 can be used when determining the parallax error. This represents part of a parallax error self-calibration. As can be seen here, the rendered image 518 acts as feedback.

The identified registration and parallax errors are provided to a virtual camera self-calibration function 524, which generally operates to update the parameters 514 associated with the virtual cameras based the identified registration and parallax errors between the current see-through camera image 504 and the rendered image 518 associated with that image 504. For example, the virtual camera self-calibration function 524 can determine how to adjust the parameters 514 associated with the virtual cameras in order to reduce the registration and parallax errors. The virtual camera self-calibration function 524 can adjust the parameters 514 associated with the virtual cameras in any suitable manner, such as by adjusting the parameters 514 to apply a translation and/or a rotation to the parameters 514 in order to reduce the registration and parallax errors.

A parameter update function 526 provides the updated parameters 514 to the final view rendering operation 490 for use in re-rendering the image 504. This results in the generation of another rendered image 518, which can again be used as feedback. As can be seen here, this approach supports both a registration error self-calibration and a parallax error self-calibration. The self-calibration process can be repeated until the registration error and/or the parallax error is less that a corresponding threshold.

Although FIG. 5 illustrates one example of a self-calibration architecture 500 supporting registration and parallax error correction for VST XR, various changes may be made to FIG. 5. For example, various components or functions in FIG. 5 may be combined, further subdivided, replicated, omitted, or rearranged and additional components or functions may be added according to particular needs.

Figure 6:
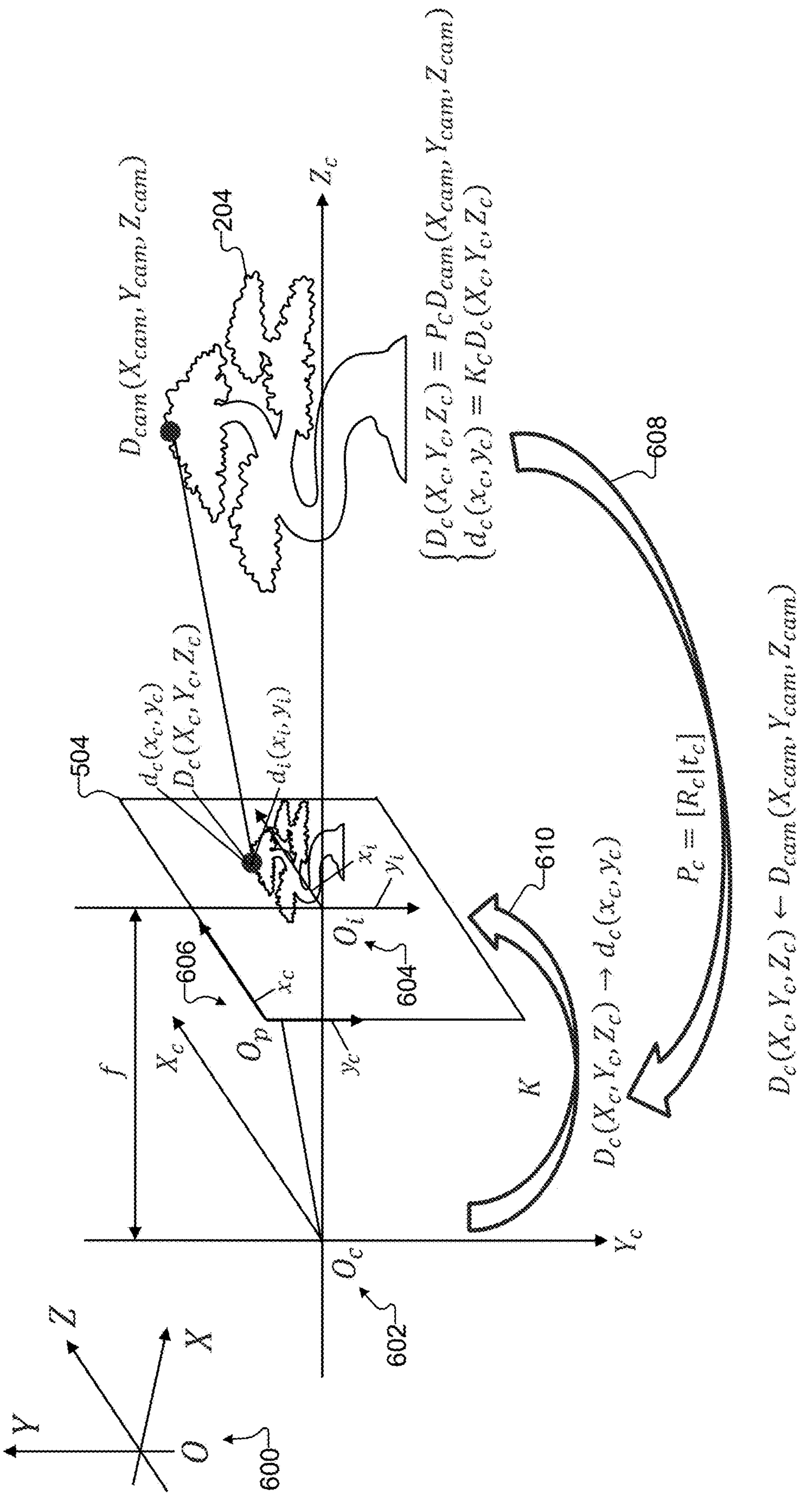
FIG. 6 illustrates example coordinate systems associated with registration and parallax error correction for VST XR in accordance with this disclosure.

FIG. 6 illustrates example coordinate systems associated with registration and parallax error correction for VST XR in accordance with this disclosure. These coordinate systems can be associated with a VST XR device, and these coordinate systems may be used as discussed below during registration and parallax error correction.

As shown in FIG. 6, a global coordinate system 600 represents a 3D coordinate system in the real world and is defined using three axes X, Y, and Z that meet at an origin O. A camera coordinate system 602 is associated with a see-through camera 206*a*-206*b* and is defined using three axes $X_c$, $Y_c$, and $Z_c$ that meet at an origin Oc. An image coordinate system 604 is associated with a see-through camera image 504 and is defined using two axes $x_i$ and $y_i$ that meet at an origin $O_i$ (which may be located at the center of the image 504). A pixel coordinate system 606 is associated with pixels within a see-through camera image 504 and is defined using two axes $x_c$ and $y_c$ that meet at an origin $O_p$ (which may be located at the top left corner or other corner of the image 504). A point of an object 204 within a 3D scene being captured is denoted as $D_{cam}(X_{cam}, Y_{cam}, Z_{cam})$ within the global coordinate system 600. That point appears within the image 504 at a point denoted $D_c(X_c, Y_c, Z_c)$ in the camera coordinate system 602, a point denoted $d_i(x_i, y_i)$ in the image coordinate system 604, and a point denoted $d_c(x_c, y_c)$ in the pixel coordinate system 606.

The relationships between the 3D point $D_{cam}$ in the scene to the point $D_c$ in the camera coordinate system 602 and an image pixel at point $d_c$ in the pixel coordinate system 606 can be defined as follows. Assume pixels of the see-through camera image 504 are generated based on the intrinsic and extrinsic parameters of the associated see-through camera 206*a*-206*b*. Assume $K_c$ is the camera matrix of the see-through camera 206*a*-206*b*, where the camera matrix is expressed as follows.

$$K_c = \begin{pmatrix} f_x & 0 & c_x \\ 0 & f_y & c_y \\ 0 & 0 & 1 \end{pmatrix}$$

Here, $(f_x, f_y)$ is the focal length of the see-through camera 206*a*-206*b*, and $(c_x, c_y)$ is the principal point of the see-through camera 206*a*-206*b*. From this, a relationship or transformation 608 can be defined between the 3D point $D_{cam}$ in the global coordinate system 600 and the camera point $D_c$ in the camera coordinate system 602, such as by defining the following relationship.

$$D_c(X_c, Y_c, Z_c, W_c) = \begin{pmatrix} R_c & t_c \\ 0 & 1 \end{pmatrix} D_{cam}(X_{cam}, Y_{cam}, Z_{cam}, W_{cam})$$

Here, $R_c$ represents a rotation matrix of the see-through camera 206*a*-206*b*, and $t_c$ represents a translation vector of the see-through camera 206*a*-206*b*. A relationship or transformation 610 can also be defined between the camera point $D_c$ in the camera coordinate system 602 and the corresponding point $d_c$ in the pixel coordinate system 606, such as by defining the following relationship.

$$\lambda_c d_c(x_c, y_c, w_c) = K_c D_c(X_c, Y_c, Z_c)$$

Here, $\lambda_c$ represents a scale factor. Rewriting these equations, the following relationship can be defined between the 3D point $D_{cam}$ in the global coordinate system 600 and the corresponding point $d_c$ in the pixel coordinate system 606.

$$\lambda_c d_c(x_c, y_c, w_c) = K_c[R_c|t_c]D_{cam}(X_{cam}, Y_{cam}, Z_{cam})$$

Here, $P_c$ is a projection matrix and may be defined as follows.

$$P_c = K_c[R_c|t_c]$$

These types of relationships can be used to support corrections of various registration and parallax errors for VST XR as described below.

Although FIG. 6 illustrates examples of coordinate systems 600-606 associated with registration and parallax error correction for VST XR, various changes may be made to FIG. 6. For example, each coordinate system 600-606 can define their axes and origin in any suitable manner.

FIGS. 7 through 14 illustrate example corrections of registration and parallax errors for VST XR in accordance with this disclosure. These corrections may, for example, be identified and implemented using the architecture 300 of FIG. 3 or the architecture 400 of FIGS. 4A and 4B described above. Note that the see-through camera 206*a*, display panel 208*a*, and user's eye 210*a* are mentioned in the following discussion and shown in FIGS. 7 through 14. The same or similar errors and corrections may involve the see-through camera 206*b*, display panel 208*b*, and user's eye 210*b*.

Figure 7:
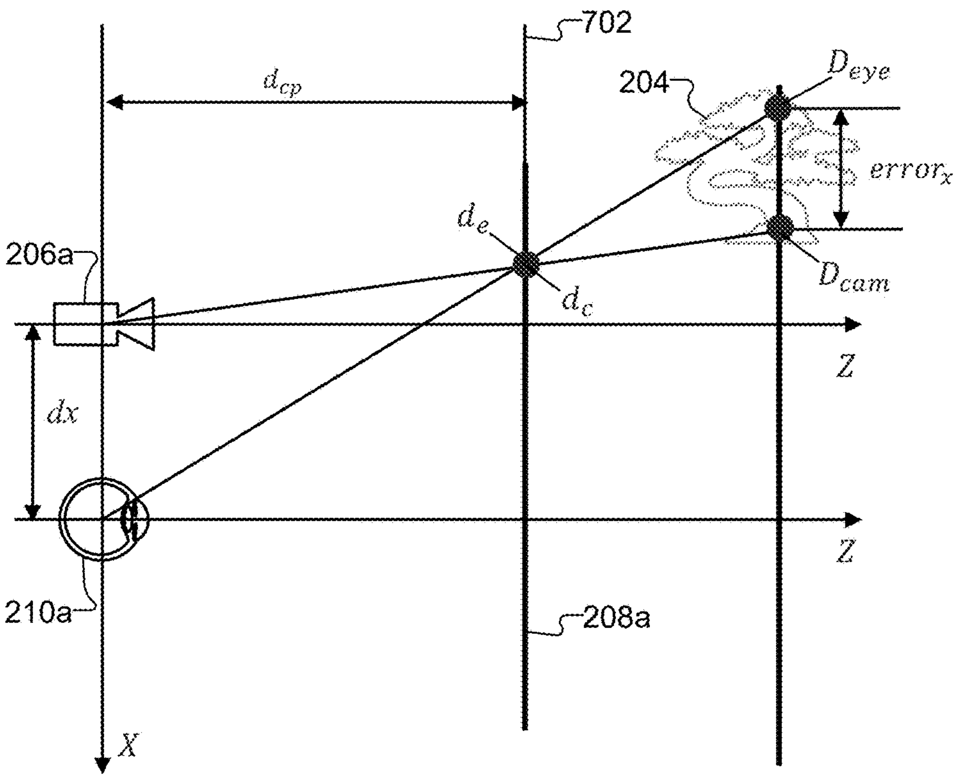
FIGS. 7 through 14 illustrate example corrections of registration and parallax errors for VST XR in accordance with this disclosure.

As shown in FIG. 7, the see-through camera 206*a* is offset laterally from the user's eye 210*a*, meaning dx is non-zero while dy and dz are substantially equal to zero. This can lead to the creation of a registration/parallax error in the x direction. For example, a point $D_{cam}$ of the object 204 appears as a point $d_e$, which can be based on the image pixel at point $d_c$ as determined by the following.

$$\lambda_e d_e(x_e, y_e, w_e) = H_{ce} d_c(x_c, y_c, w_c)$$

Here, $H_{ce}$ represents a homographic transformation matrix between the see-through camera 206*a* and the virtual camera at the user's eye 210*a*, which in some cases may be expressed as follows.

$$H_{ce} = K_e\left(R_{ce} + \frac{t_{ce} n_c^T}{d_{cp}}\right)K_c^{-1}$$

Here, $K_e$ represents the camera matrix of the virtual camera. Since a transformation is desired from the see-through camera 206*a* to the virtual camera, the following can be obtained.

$$K_e = K_c$$

Here, $R_{ce}$ represents a rotation matrix between the see-through camera 206*a* and the virtual camera, $t_{ce}$ represents a translation vector between the see-through camera 206*a* and the virtual camera, $n_c$ represents a normal vector of an image plane 702, and $d_{cp}$ represents a distance between the see-through camera 206*a* and the image plane 702. Based on this, the following can be obtained.

$$\begin{pmatrix} x_e \\ y_e \\ w_e \end{pmatrix} = \frac{1}{\lambda_e} H_{ce} \begin{pmatrix} x_c \\ y_c \\ w_c \end{pmatrix}$$

Since both the see-through camera 206*a* and the virtual camera have the same orientation in FIG. 7, $R_{ce}$=I, where I represents an identity matrix. Thus, the virtual camera only has a translation $d_x$ relative to the see-through camera 206*a*. As a result, the following can be obtained.

$$t_{ce} = \begin{pmatrix} d_x \\ 0 \\ 0 \end{pmatrix}$$

The image plane 702 is perpendicular to the see-through camera 206*a*, so the following can be obtained.

$$n_c = \begin{pmatrix} 0 \\ 0 \\ 1 \end{pmatrix}$$

Based on this, the homographic transformation matrix $H_{ce}$ can be rewritten as follows.

$$H_{ce} = K_c \begin{pmatrix} 1 & 0 & \frac{d_x}{d_{cp}} \\ 0 & 1 & 0 \\ 0 & 0 & 1 \end{pmatrix} K_c^{-1}$$

The relationship between the virtual camera and the 3D scene can be expressed as follows.

$$\lambda_e \begin{pmatrix} x_e \\ y_e \\ 1 \\ w_e \end{pmatrix} = P_e \begin{pmatrix} X_e \\ Y_e \\ Z_e \\ W_e \end{pmatrix}$$

Here, $P_e$ represents a projection matrix, which could be expressed as follows.

$$P_e = K_e[R_e|t_e]$$

where:

$$\begin{cases} K_e = K_c \\ R_e = R_c \end{cases}$$

$$t_e = \begin{pmatrix} t_{xc} + d_x \\ t_{yc} \\ t_{zc} \end{pmatrix}$$

The location of the 3D point as captured at the virtual camera could be expressed as follows.

$$\begin{pmatrix} X_e \\ Y_e \\ Z_e \\ W_e \end{pmatrix} = \lambda_e P_e^{-1} \begin{pmatrix} x_e \\ y_e \\ 1 \\ we \end{pmatrix}$$

Based on this, the projection matrix $P_e$ could be defined as follows.

$$P_e = K_c[R_c|t_e]$$

As shown in FIG. 7, if the virtual camera image point $d_e(x_e, y_e)$ is matched to the same location of the corresponding see-through camera image point $d_c(x_c, y_c)$, the virtual camera would render the same image as the see-through camera image. However, this creates an error $error_x$ between the actual position of the 3D point $D_{cam}$ and the perceived position of that point $D_{eye}$ created by presentation of the virtual camera image point $d_e$. In this condition, the location of the 3D point as captured at the virtual camera could be rewritten as follows.

$$\begin{pmatrix} X_e \\ Y_e \\ Z_e \\ W_e \end{pmatrix} = \lambda_e P_e^{-1} \begin{pmatrix} x_c \\ y_c \\ 1 \\ wc \end{pmatrix}$$

Here, the points $D_{cam}$ and $D_{eye}$ do not overlap, which can be easily noticeable by a user. Since there is only a shift in the x direction between the see-through camera 206*a* and the virtual camera, the error can be defined as follows.

$$\text{error}_x - X_{eye} - X_{cam}$$

Figure 8:
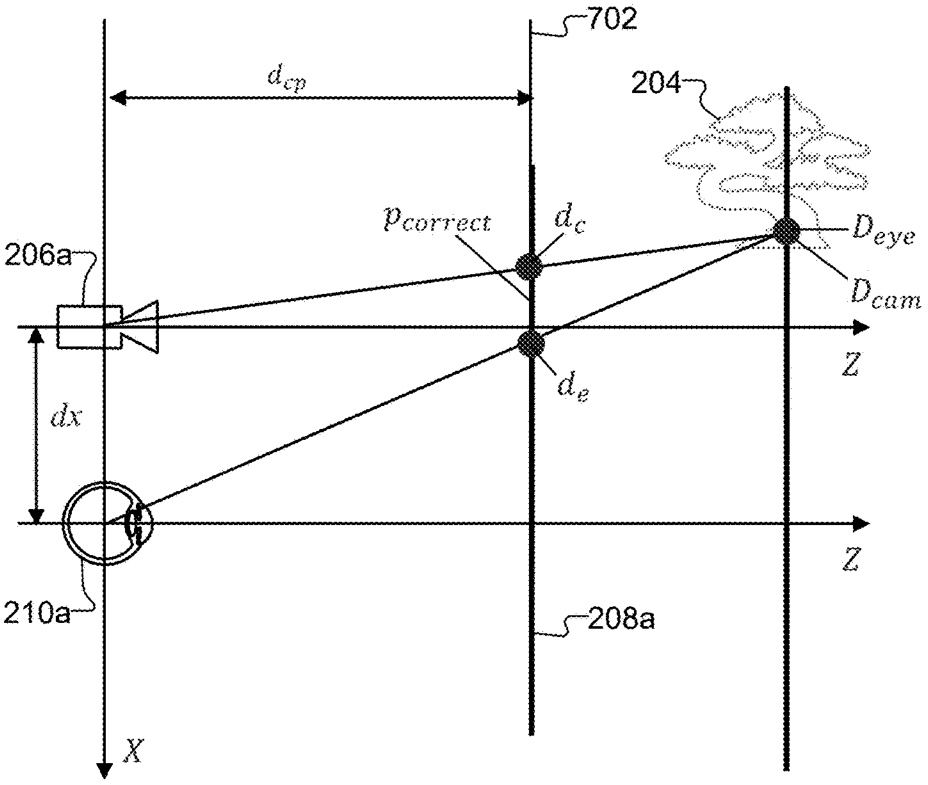

To register the points $D_{cam}$ and $D_{eye}$ generated by the see-through camera 206*a* and the virtual camera and make them overlap as shown in FIG. 8, the location of the eye view image point $d_c$ can be adjusted by a specified error correction $p_{correct}$. In this example, the point $d_c$ and the point $d_e$ will not overlap one another, but the points $D_{cam}$ and $D_{eye}$ will substantially overlap and thereby resolve the error. In some cases, the error correction $p_{correct}$ may be determined as follows.

$$p_{correct} = x_c - x_e$$

From this, the location of the eye view image point $d_e$ can be determined as follows.

$$\lambda_e \begin{pmatrix} x_e \\ y_e \\ 1 \\ w_e \end{pmatrix} = P_e \begin{pmatrix} X_{cam} \\ Y_{cam} \\ Z_{cam} \\ W_{eya} \end{pmatrix}$$

Figure 9:
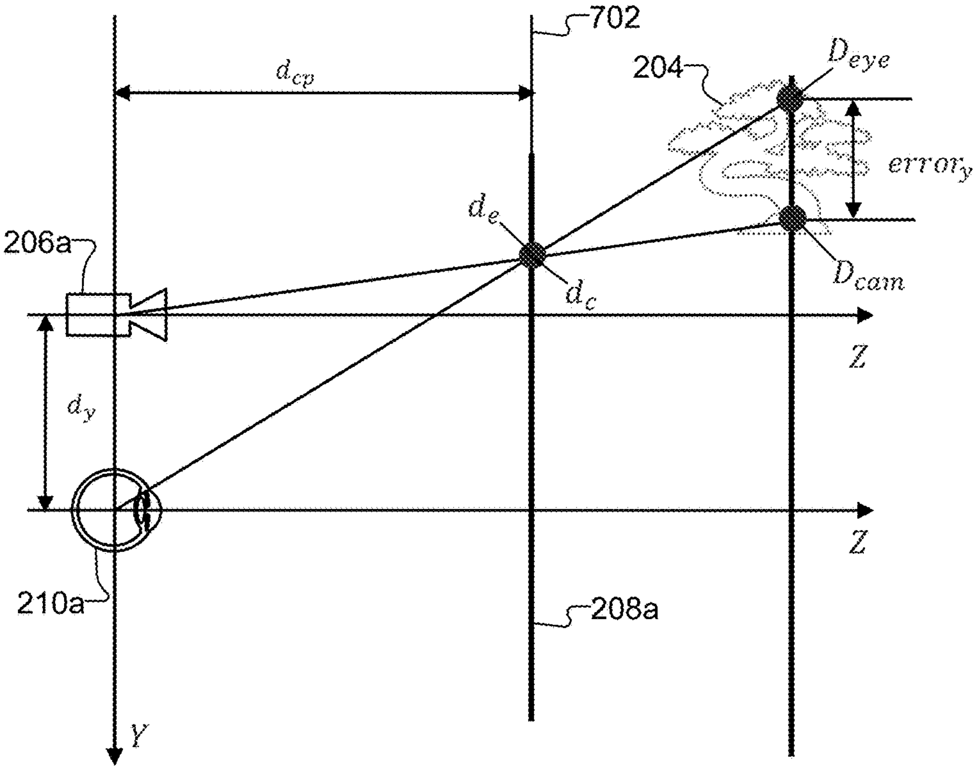

As shown in FIG. 9, the see-through camera 206*a* is offset vertically from the user's eye 210*a*, meaning dy is non-zero while dx and dz are substantially equal to zero. This can lead to the creation of a registration/parallax error in the y direction. For example, a point $D_{cam}$ of the object 204 appears as a point $d_e$, which can be based on the image pixel at point $d_c$ as determined by the following.

$$\lambda_e d_e(x_e, y_e, w_e) = H_{ce} d_c(x_c, y_c, w_c)$$

Here, $H_{ce}$ represents a homographic transformation matrix between the see-through camera 206*a* and the virtual camera at the user's eye 210*a*, which in some cases may be expressed as follows.

$$H_{ce} = K_e \left( R_{ce} + \frac{t_{ce} n_c^T}{d_{cp}} \right) K_c^{-1}$$

Here, $K_e$ represents the camera matrix of the virtual camera. Since a transformation is desired from the see-through camera 206*a* to the virtual camera, the following can be obtained.

$$K_e = K_c$$

Here, $R_{ce}$ represents a rotation matrix between the see-through camera 206*a* and the virtual camera, $t_{ce}$ represents a translation vector between the see-through camera 206*a* and the virtual camera, $n_c$ represents a normal vector of the image plane 702, and $d_{cp}$ represents a distance between the see-through camera 206*a* and the image plane 702. Based on this, the following can be obtained.

$$\begin{pmatrix} x_e \\ y_e \\ w_e \end{pmatrix} = \frac{1}{\lambda_e} H_{ce} \begin{pmatrix} x_c \\ y_c \\ w_c \end{pmatrix}$$

Since both the see-through camera 206*a* and the virtual camera have the same orientation in FIG. 9, $R_{ce}$=I, where I represents an identity matrix. Thus, the virtual camera only has a translation dy relative to the see-through camera 206*a*. As a result, the following can be obtained.

$$t_{ce} = \begin{pmatrix} 0 \\ d_y \\ 0 \end{pmatrix}$$

The image plane 702 is perpendicular to the see-through camera 206*a*, so the following can be obtained.

$$n_c = \begin{pmatrix} 0 \\ 0 \\ 1 \end{pmatrix}$$

Based on this, the homographic transformation matrix $H_{ce}$ can be rewritten as follows.

$$H_{ce} = K_c \begin{pmatrix} 1 & 0 & 0 \\ 0 & 1 & \frac{d_y}{d_{cp}} \\ 0 & 0 & 1 \end{pmatrix} K_c^{-1}$$

The relationship between the virtual camera and the 3D scene can be expressed as follows.

$$\lambda_e \begin{pmatrix} x_e \\ y_e \\ 1 \\ w_e \end{pmatrix} = P_e \begin{pmatrix} X_e \\ Y_e \\ Z_e \\ W_e \end{pmatrix}$$

Here, $P_e$ represents a projection matrix, which could be expressed as follows.

$$P_e = K_e[R_e \mid t_e]$$

where:

$$\begin{cases} K_e = K_c \\ R_e = R_c \end{cases}$$

$$t_e = \begin{pmatrix} t_{xc} \\ t_{yc} + d_y \\ t_{zc} \end{pmatrix}$$

The location of the 3D point as captured at the virtual camera could be expressed as follows.

$$\begin{pmatrix} X_e \\ Y_e \\ Z_e \\ W_e \end{pmatrix} = \lambda_e P_e^{-1} \begin{pmatrix} x_e \\ y_e \\ 1 \\ we \end{pmatrix}$$

Based on this, the projection matrix $P_e$ could be defined as follows.

$$P_e = K_c[R_c \mid t_e]$$

As shown in FIG. 9, if the virtual camera image point $d_e(x_e, y_e)$ is matched to the same location of the corresponding see-through camera image point $d_c(x_c, y_c)$, the virtual camera would render the same image as the see-through camera image. However, this creates an error $error_y$ between the actual position of the 3D point $D_{cam}$ and the perceived position of that point $D_{eye}$ created by presentation of the virtual camera image point $d_e$. In this condition, the location of the 3D point as captured at the virtual camera could be rewritten as follows.

$$\begin{pmatrix} X_e \\ Y_e \\ Z_e \\ W_e \end{pmatrix} = \lambda_e P_e^{-1} \begin{pmatrix} x_c \\ y_c \\ 1 \\ wc \end{pmatrix}$$

Here, the points $D_{cam}$ and $D_{eye}$ do not overlap, which can be easily noticeable by a user. Since there is only a shift in the y direction between the see-through camera 206$a$ and the virtual camera, the error can be defined as follows.

$$\text{error}_y = Y_{eye} - Y_{cam}$$

Figure 10:
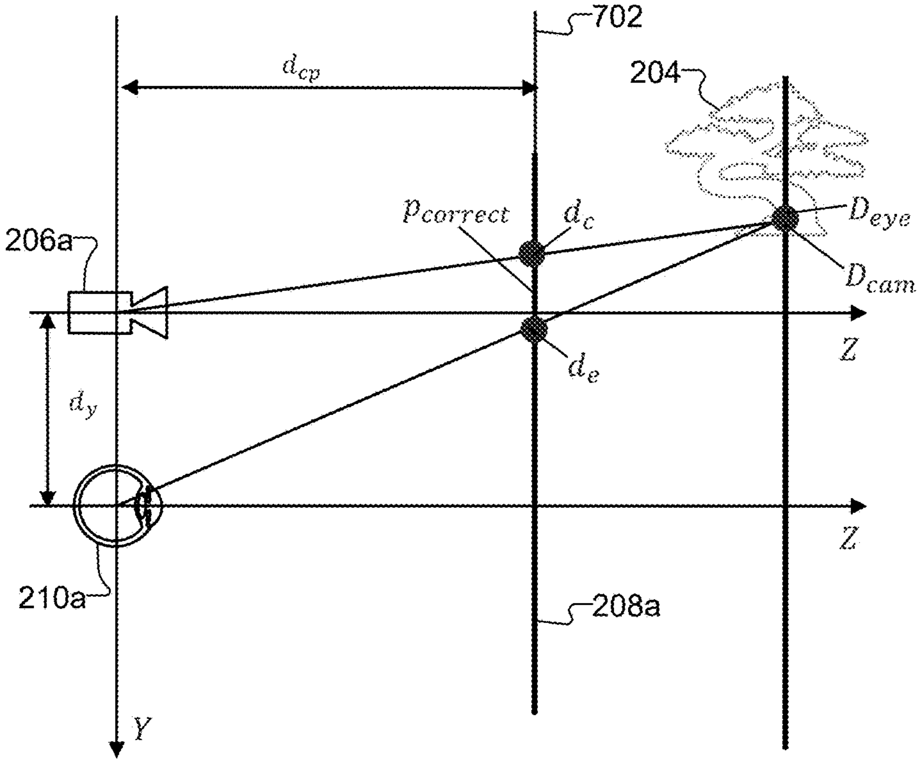

To register the points $D_{cam}$ and $D_{eye}$ generated by the see-through camera 206$a$ and the virtual camera and make them overlap as shown in FIG. 10, the location of the eye view image point $d_c$ can be adjusted by a specified error correction $p_{correct}$. In this example, the point $d_c$ and the point $d_c$ will not overlap one another, but the points $D_{cam}$ and $D_{eye}$ will substantially overlap and thereby resolve the error. In some cases, the error correction $p_{correct}$ may be determined as follows.

$$p_{correct} = y_c - y_e$$

From this, the location of the eye view image point $d_c$ can be determined as follows.

$$\lambda_e \begin{pmatrix} x_e \\ y_e \\ 1 \\ w_e \end{pmatrix} = P_e \begin{pmatrix} X_{cam} \\ Y_{cam} \\ Z_{cam} \\ W_{eya} \end{pmatrix}$$

Figure 11:
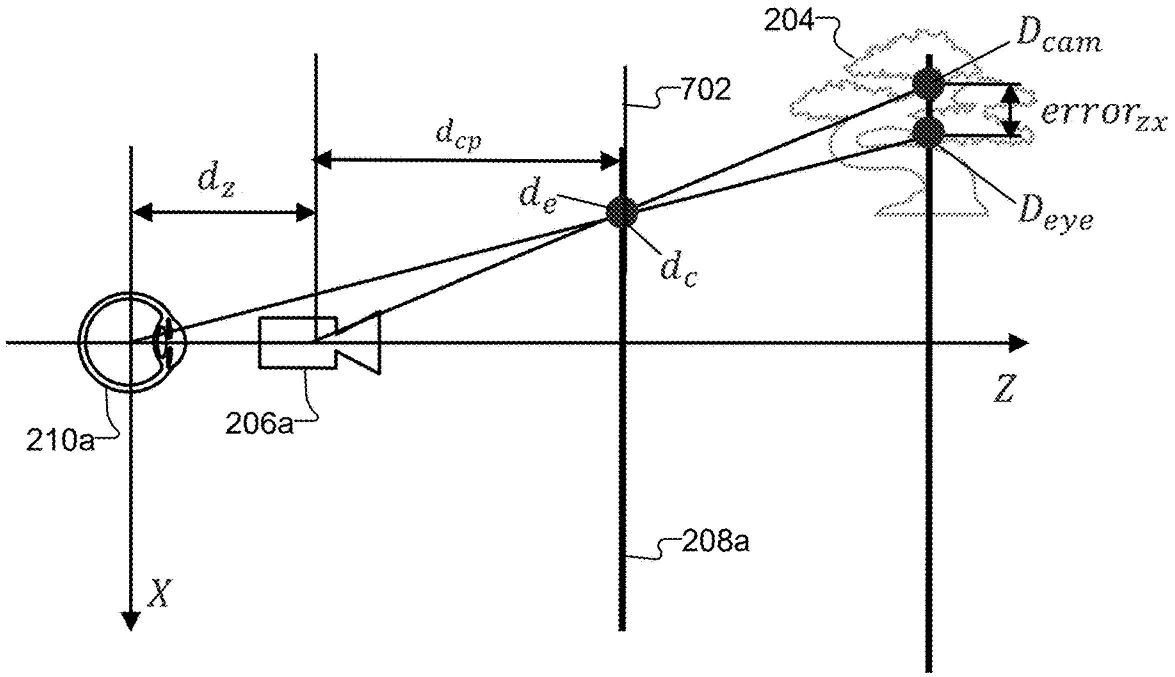
Figure 13:
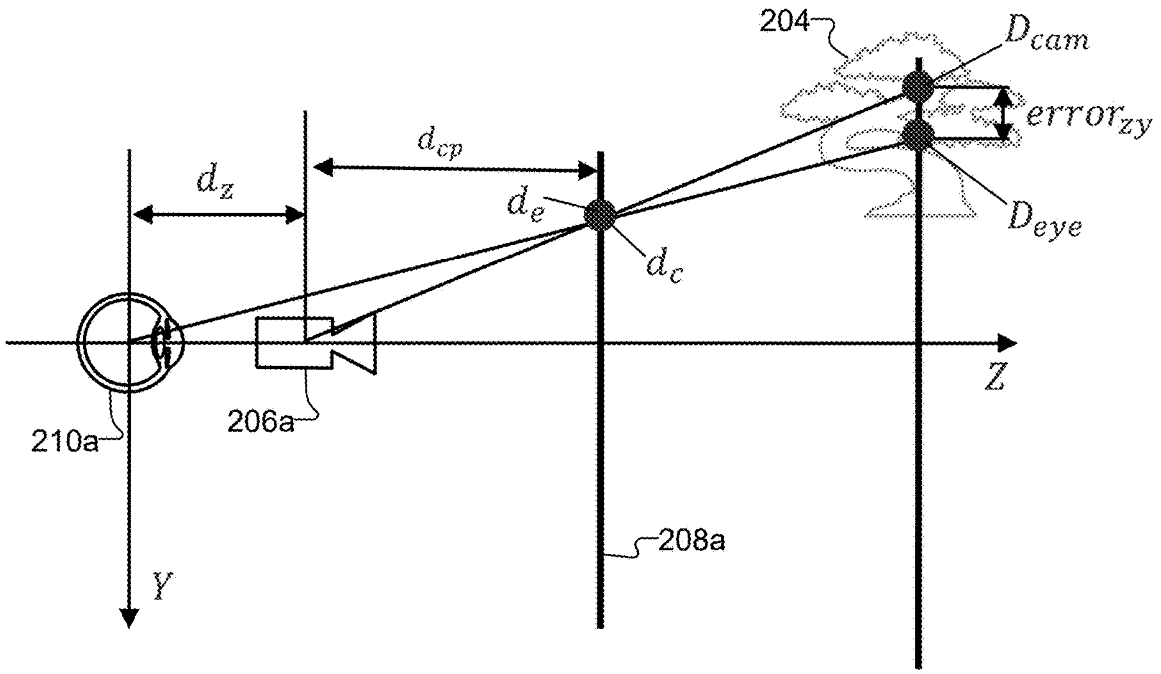

As shown in FIGS. 11 and 13, the see-through camera 206$a$ is offset axially from the user's eye 210$a$, meaning dz is non-zero while dx and dy are substantially equal to zero. This can lead to the creation of registration/parallax errors in both the x and y directions. For example, in both the x and y directions, a point $D_{cam}$ of the object 204 appears as a point $d_e$, which can be based on the image pixel at point $d_c$ as determined by the following.

$$\lambda_e d_e(x_e, y_e, w_e) = H_{ce} d_c(x_c, y_c, w_c)$$

Here, $H_{ce}$ represents a homographic transformation matrix between the see-through camera 206$a$ and the virtual camera at the user's eye 210$a$, which in some cases may be expressed as follows.

$$H_{ce} = K_e \left( R_{ce} + \frac{t_{ce} n_c^T}{d_{cp}} \right) K_c^{-1}$$

Here, $K_e$ represents the camera matrix of the virtual camera. Since a transformation is desired from the see-through camera 206$a$ to the virtual camera, the following can be obtained.

$$K_e = K_c$$

Here, $R_{ce}$ represents a rotation matrix between the see-through camera 206$a$ and the virtual camera, $t_{ce}$ represents a translation vector between the see-through camera 206$a$ and the virtual camera, $n_c$ represents a normal vector of the image plane 702, and $d_{cp}$ represents a distance between the see-through camera 206$a$ and the image plane 702. Based on this, the following can be obtained.

$$\begin{pmatrix} x_e \\ y_e \\ w_e \end{pmatrix} = \frac{1}{\lambda_e} H_{ce} \begin{pmatrix} x_c \\ y_c \\ w_c \end{pmatrix}$$

Since both the see-through camera 206$a$ and the virtual camera have the same orientation in FIGS. 11 and 13, $R_{ce}=I$, where I represents an identity matrix. Thus, the virtual camera only has a translation dz relative to the see-through camera 206$a$. As a result, the following can be obtained.

$$t_{ce} = \begin{pmatrix} 0 \\ 0 \\ d_z \end{pmatrix}$$

The image plane 702 is perpendicular to the see-through camera 206$a$, so the following can be obtained.

$$n_c = \begin{pmatrix} 0 \\ 0 \\ 1 \end{pmatrix}$$

Based on this, the homographic transformation matrix $H_{ce}$ can be rewritten as follows.

$$H_{ce} = K_c \begin{pmatrix} 1 & 0 & 0 \\ 0 & 1 & 0 \\ 0 & 0 & \frac{d_z}{d_{cp}} \end{pmatrix} K_c^{-1}$$

The relationship between the virtual camera and the 3D scene can be expressed as follows.

$$\lambda_e\begin{pmatrix} x_e \\ y_e \\ 1 \\ w_e \end{pmatrix} = P_e\begin{pmatrix} X_e \\ Y_e \\ Z_e \\ W_e \end{pmatrix}$$

Here, $P_e$ represents a projection matrix, which could be expressed as follows.

$$P_e = K_e[R_e|t_e]$$

where:

$$\begin{cases} K_e = K_c \\ R_e = R_c \end{cases}$$

$$t_e = \begin{pmatrix} t_{xc} \\ t_{yc} \\ t_{zc} + d_z \end{pmatrix}$$

The location of the 3D point as captured at the virtual camera could be expressed as follows.

$$\begin{pmatrix} X_e \\ Y_e \\ Z_e \\ W_e \end{pmatrix} = \lambda_e P_e^{-1}\begin{pmatrix} x_c \\ y_e \\ 1 \\ we \end{pmatrix}$$

Based on this, the projection matrix $P_e$ could be defined as follows.

$$P_e = K_c[R_c|t_e]$$

Figure 12:
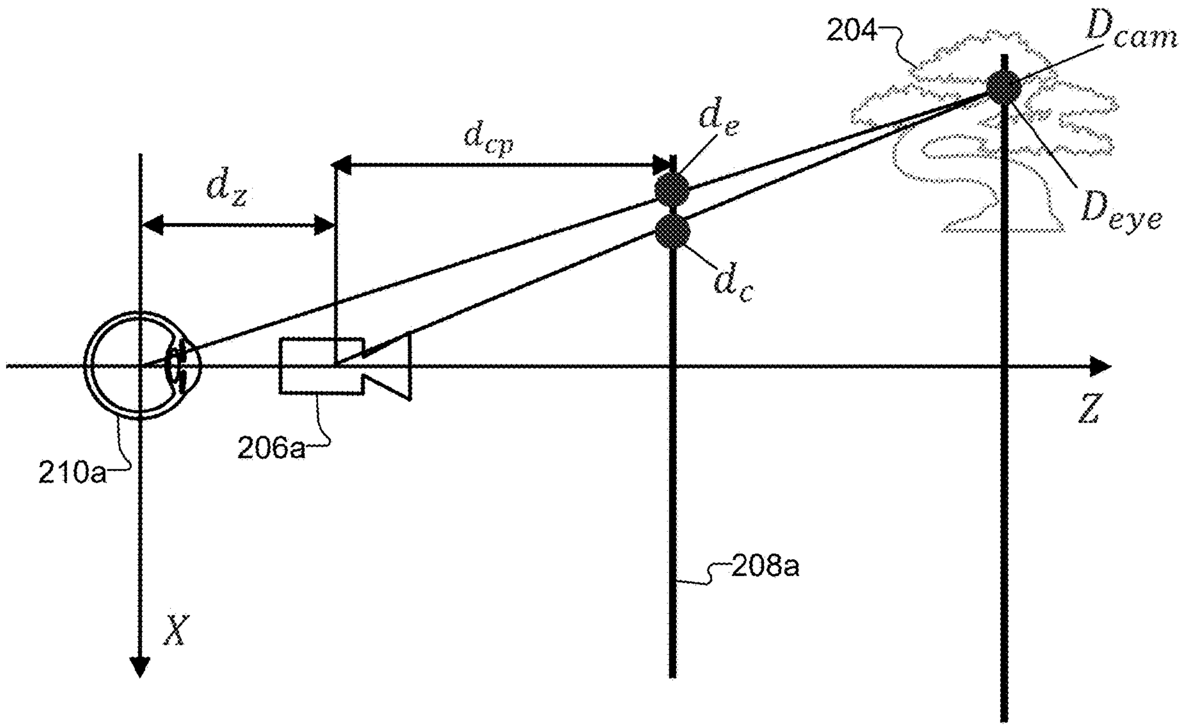

As shown in FIG. 12, if the virtual camera image point $d_e(x_e, y_e)$ is matched to the same location of the corresponding see-through camera image point $d_c(x_c, y_c)$, the virtual camera would render the same image as the see-through camera image. However, this creates an error $error_{zx}$ between the actual position of the 3D point $D_{cam}$ and the perceived position of that point $D_{eye}$ created by presentation of the virtual camera image point $d_e$. In this condition, the location of the 3D point as captured at the virtual camera could be rewritten as follows.

$$\begin{pmatrix} X_e \\ Y_e \\ Z_e \\ W_e \end{pmatrix} = \lambda_e P_e^{-1}\begin{pmatrix} x_c \\ y_c \\ 1 \\ wc \end{pmatrix}$$

Here, the points $D_{cam}$ and $D_{eye}$ do not overlap, which can be easily noticeable by a user. Since there is only a shift in the y direction between the see-through camera 206*a* and the virtual camera, the error can be defined as follows.

$$error_{zx} = X_{eye} - X_{cam}$$

To register the points $D_{cam}$ and $D_{eye}$ generated by the see-through camera 206*a* and the virtual camera and make them overlap as shown in FIG. 12, the location of the eye view image point $d_e$ can be adjusted by a specified error correction $p_{x\_correct}$. In this example, the point $d_c$ and the point $d_e$ will not overlap one another, but the points $D_{cam}$ and $D_{eye}$ will substantially overlap and thereby resolve the error in the x direction. In some cases, the error correction $p_{x\_correct}$ may be determined as follows.

$$p_{x\_correct} = x_c - x_e$$

From this, the location of the eye view image point $d_e$ can be determined as follows.

$$\lambda_e\begin{pmatrix} x_e \\ y_e \\ 1 \\ w_e \end{pmatrix} = P_e\begin{pmatrix} X_{cam} \\ Y_{cam} \\ Z_{cam} \\ W_{eya} \end{pmatrix}$$

Figure 14:
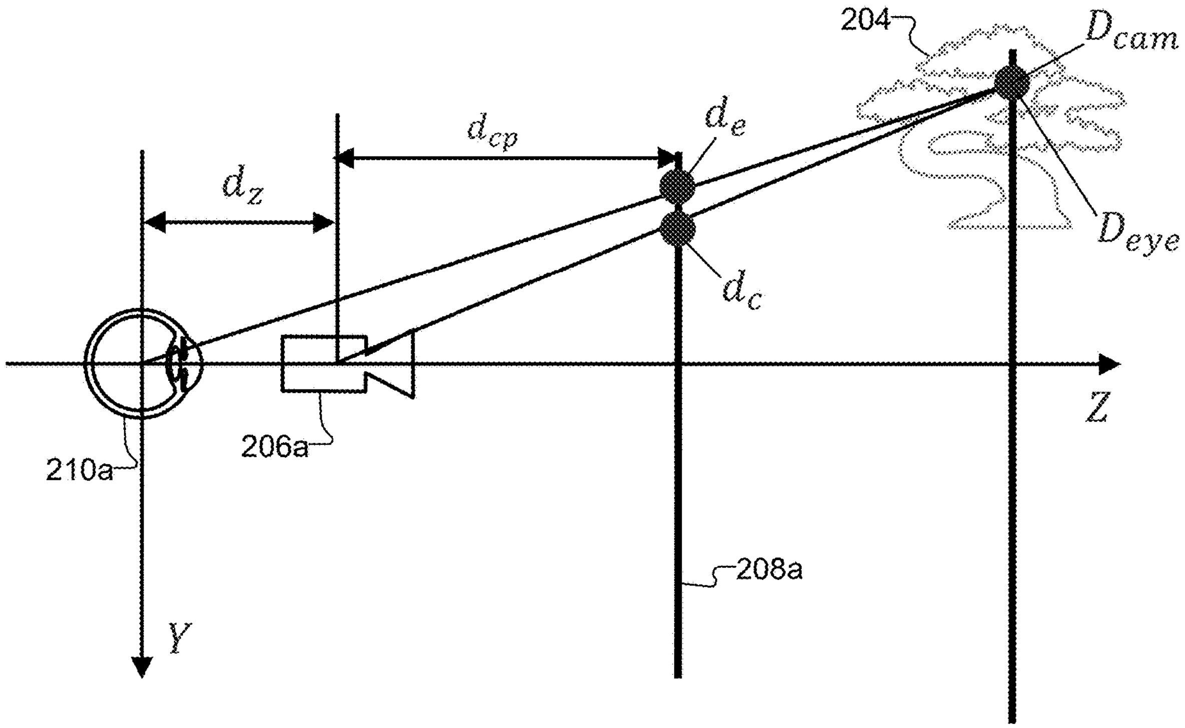

Similarly, as shown in FIG. 14, if the virtual camera image point $d_e(x_e, y_e)$ is matched to the same location of the corresponding see-through camera image point $d_c(x_c, y_c)$, the virtual camera would render the same image as the see-through camera image. However, this creates an error $error_{zy}$ between the actual position of the 3D point $D_{cam}$ and the perceived position of that point $D_{eye}$ created by presentation of the virtual camera image point $d_e$. In this condition, the location of the 3D point as captured at the virtual camera could be rewritten as follows.

$$\begin{pmatrix} X_e \\ Y_e \\ Z_e \\ W_e \end{pmatrix} = \lambda_e P_e^{-1}\begin{pmatrix} x_c \\ y_c \\ 1 \\ wc \end{pmatrix}$$

Here, the points $D_{cam}$ and $D_{eye}$ do not overlap, which can be easily noticeable by a user. Since there is only a shift in the y direction between the see-through camera 206*a* and the virtual camera, the error can be defined as follows.

$$error_{zy} = Y_{eye} - Y_{cam}$$

To register the points $D_{cam}$ and $D_{eye}$ generated by the see-through camera 206*a* and the virtual camera and make them overlap as shown in FIG. 12, the location of the eye view image point $d_e$ can be adjusted by a specified error correction $p_{y\_correct}$. In this example, the point $d_c$ and the point $d_e$ will not overlap one another, but the points $D_{cam}$ and $D_{eye}$ will substantially overlap and thereby resolve the error in the y direction. In some cases, the error correction $p_{y\_correct}$ may be determined as follows.

$$p_{y\_correct} = y_c - y_e$$

From this, the location of the eye view image point $d_e$ can be determined as follows.

$$\lambda_e\begin{pmatrix}x_e\\y_e\\1\\w_e\end{pmatrix}=P_e\begin{pmatrix}X_{cam}\\Y_{cam}\\Z_{cam}\\W_{eya}\end{pmatrix}$$

Although FIGS. 7 through 14 illustrate examples of corrections of registration and parallax errors for VST XR, various changes may be made to FIGS. 7 through 14. For example, FIGS. 7 through 14 have illustrated errors caused by translation of a see-through camera 206*a* relative to a user's eye in one direction (x, y, or z translation). However, the see-through camera 206*a* may be translated relative to a user's eye in multiple directions, and/or the see-through camera 206*a* may be rotated relative to the axis of a user's eye when looking straight ahead. The equations and mathematical derivations shown above can be modified to account for these other configurations of the see-through camera 206*a*.

Figure 15:
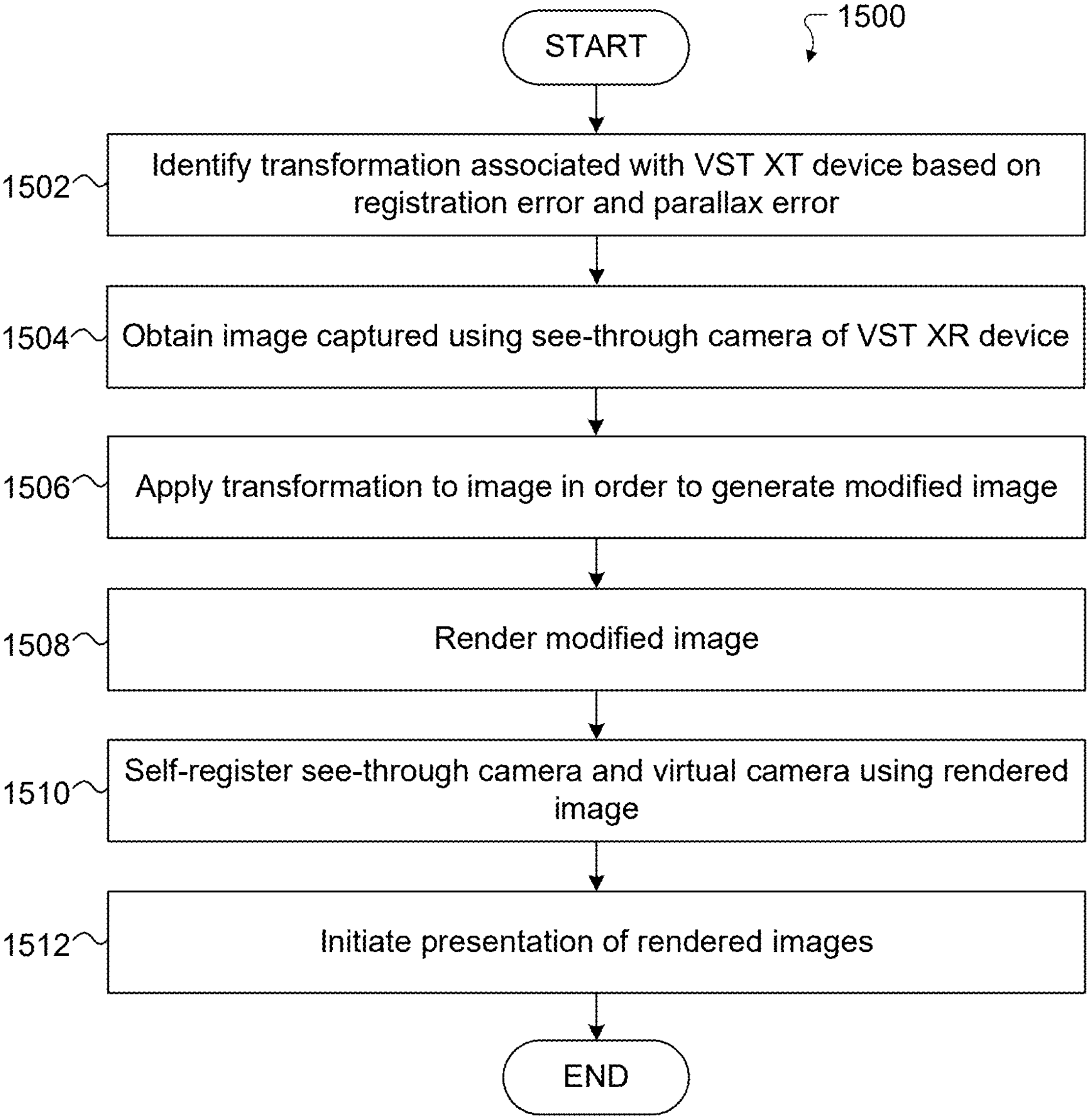
FIG. 15 illustrates an example method for registration and parallax error correction for VST XR in accordance with this disclosure.

FIG. 15 illustrates an example method 1500 for registration and parallax error correction for VST XR in accordance with this disclosure. For ease of explanation, the method 1500 of FIG. 15 is described as being performed using the electronic device 101 in the network configuration 100 of FIG. 1, where the electronic device 101 can implement the architecture 300 of FIG. 3 or the architecture 400 of FIGS. 4A and 4B. However, the method 1500 may be performed using any other suitable device(s) and architecture(s) and in any other suitable system(s).

As shown in FIG. 15, a transformation associated with a VST XR device is identified at step 1502. This could include, for example, the processor 120 of the electronic device 101 generating a transformation using a registration error and a parallax error. The registration error and the parallax error can be based on one or more differences between (i) one or more actual positions of contents of a scene as imaged using a see-through camera 206*a*-206*b* of the electronic device 101 and (ii) one or more perceived positions of the contents of the scene at a virtual camera associated with a viewpoint of a user when viewing a display panel 208*a*-208*b* of the electronic device 101. In some cases, a registration error model 310 can be used to identify the registration error, and a parallax error model 312 (separate from the registration error model 310) can be used to identify the parallax error. In some embodiments, the transformation is static and is based on the configuration of the electronic device 101.

An image captured using the see-through camera of the VST XR device is obtained at step 1504. This could include, for example, the processor 120 of the electronic device 101 obtaining a see-through camera image 504 captured using the see-through camera 206*a*-206. The image is transformed by applying the identified transformation to the image at step 1506. This could include, for example, the processor 120 of the electronic device 101 applying the identified transformation to correct for registration and parallax errors. This results in the generation of a modified image.

The modified image is rendered at step 1508. This could include, for example, the processor 120 of the electronic device 101 rendering the modified image for display. A self-registration of the see-through camera and the virtual camera may optionally be performed at step 1510. This could include, for example, the processor 120 of the electronic device 101 using the rendered image as feedback (such as within the self-calibration architecture 500) and possibly adjusting parameters of the virtual camera used to render the modified image. If necessary, step 1508 can be repeated one or more times based on the feedback. Presentation of the rendered image can be initiated at step 1512. This could include, for example, the processor 120 of the electronic device 101 presenting the final version of the rendered image on the display panel 208*a*-208*b*.

Although FIG. 15 illustrates one example of a method 1500 for registration and parallax error correction for VST XR, various changes may be made to FIG. 15. For example, while shown as a series of steps, various steps in FIG. 15 may overlap, occur in parallel, occur in a different order, or occur any number of times (including zero times). Also, various steps in FIG. 15 may be repeated in order to process any suitable number of images from any suitable number of see-through cameras, such as to process a sequence of images from left and right see-through cameras 206*a*-206*b*.

It should be noted that the functions described above can be implemented in an electronic device 101, 102, 104, server 106, or other device(s) in any suitable manner. For example, in some embodiments, at least some of the functions can be implemented or supported using one or more software applications or other software instructions that are executed by the processor 120 of the electronic device 101, 102, 104, server 106, or other device(s). In other embodiments, at least some of the functions can be implemented or supported using dedicated hardware components. In general, the functions described above can be performed using any suitable hardware or any suitable combination of hardware and software/firmware instructions. Also, the functions described above can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

identifying a transformation associated with a video see-through (VST) extended reality (XR) device using a registration error and a parallax error, the registration error and the parallax error based on one or more differences between (i) one or more actual positions of contents of a scene as imaged using a see-through camera of the VST XR device and (ii) one or more perceived positions of the contents of the scene at a virtual camera associated with a viewpoint of a user when viewing a display panel of the VST device;

obtaining an image that captures an object using the see-through camera;

applying the transformation to the image in order to generate a modified image;

rendering the modified image for presentation on the display panel; and self-registering the see-through camera and the virtual camera by integrating (i) a self-calibration of the virtual camera based on the registration error and (ii) a self-calibration of the virtual camera based on the parallax error;

wherein applying the transformation modifies the image such that a perceived position of the object substantially matches an actual position of the object when the display panel is viewed by the user.

2. The method of claim 1, wherein:

self-registering the see-through camera and the virtual camera updates one or more parameters of the virtual camera; and the one or more updated parameters of the virtual camera are used to re-render the modified image.

3. The method of claim 1, wherein self-registering the see-through camera and the virtual camera repeats until at least one of an updated registration error or an updated parallax error is less than a threshold.

4. The method of claim 1, wherein identifying the transformation comprises:

using a registration model to identify the registration error; and using a parallax model to identify the parallax error, the parallax model separate from the registration model.

5. The method of claim 1, wherein the transformation comprises a static transformation.

6. The method of claim 1, wherein the transformation is based on one or more extrinsic parameters of the see-through camera, one or more extrinsic parameters of the display panel, and one or more extrinsic parameters of the virtual camera.

7. A video see-through (VST) extended reality (XR) device comprising:

a see-through camera;

a display panel; and at least one processing device configured to:

identify a transformation using a registration error and a parallax error, the registration error and the parallax error based on one or more differences between (i) one or more actual positions of contents of a scene as imaged using the see-through camera and (ii) one or more perceived positions of the contents of the scene at a virtual camera associated with a viewpoint of a user when viewing the display panel;

obtain an image that captures an object using the see-through camera;

apply the transformation to the image in order to generate a modified image; and render the modified image for presentation on the display panel;

wherein the at least one processing device is configured to apply the transformation in order to modify the image such that a perceived position of the object substantially matches an actual position of the object when the display panel is viewed by the user; and wherein, to identify the transformation, the at least one processing device is configured to:

use a registration model to identify the registration error; and use a parallax model to identify the parallax error, the parallax model separate from the registration model.

8. The VST XR device of claim 7, wherein the at least one processing device is further configured to self-register the see-through camera and the virtual camera by integrating (i) a self-calibration of the virtual camera based on the registration error and (ii) a self-calibration of the virtual camera based on the parallax error.

9. The VST XR device of claim 8, wherein:

the at least one processing device is configured to update one or more parameters of the virtual camera as a result of self-registering the see-through camera and the virtual camera; and the at least one processing device is configured to re-render the modified image using the one or more updated parameters.

10. The VST XR device of claim 8, wherein the at least one processing device is configured to repeatedly self-register the see-through camera and the virtual camera until at least one of an updated registration error or an updated parallax error is less than a threshold.

11. The VST XR device of claim 7, wherein the transformation comprises a static transformation.

12. The VST XR device of claim 7, wherein the transformation is based on one or more extrinsic parameters of the see-through camera, one or more extrinsic parameters of the display panel, and one or more extrinsic parameters of the virtual camera.

13. The VST XR device of claim 7, wherein, to identify the transformation, the at least one processing device is configured to:

create an initial distortion mesh based on one or more extrinsic parameters of the see-through camera, one or more extrinsic parameters of the display panel, and one or more extrinsic parameters of the virtual camera; and modify the initial distortion mesh based on the registration error and the parallax error to generate a modified distortion mesh, the transformation based on the modified distortion mesh.

14. The VST XR device of claim 13, wherein the at least one processing device is further configured to adjust the modified distortion mesh to perform camera undistortion, correct for display lens geometric distortion, and correct for chromatic aberration.

15. The VST XR device of claim 14, wherein:

a final distortion mesh represents a passthrough transformation; and the at least one processing device is configured to define the passthrough transformation ahead-of-time, store the passthrough transformation, and apply the passthrough transformation when image capture using the see-through camera starts.

16. A non-transitory machine readable medium containing instructions that when executed cause at least one processor of a video see-through (VST) extended reality (XR) device to:

identify a transformation using a registration error and a parallax error, the registration error and the parallax error based on one or more differences between (i) one or more actual positions of contents of a scene as imaged using a see-through camera of the VST XR device and (ii) one or more perceived positions of the contents of the scene at a virtual camera associated with a viewpoint of a user when viewing a display panel of the VST device;

obtain an image that captures an object using the see-through camera;

apply the transformation to the image in order to generate a modified image;

render the modified image for presentation on the display panel; and self-register the see-through camera and the virtual camera by integrating (i) a self-calibration of the virtual camera based on the registration error and (ii) a self-calibration of the virtual camera based on the parallax error;

wherein the instructions when executed cause the at least one processor to apply the transformation in order to modify the image such that a perceived position of the object substantially matches an actual position of the object when the display panel is viewed by the user.

17. The non-transitory machine readable medium of claim 16, wherein:

the instructions when executed cause the at least one processor to update one or more parameters of the virtual camera as a result of self-registering the see-through camera and the virtual camera; and the instructions when executed cause the at least one processor to re-render the modified image using the one or more updated parameters.

18. The non-transitory machine readable medium of claim 16, wherein the instructions when executed cause the at least one processor to repeatedly self-register the see-through camera and the virtual camera until at least one of an updated registration error or an updated parallax error is less than a threshold.

19. The non-transitory machine readable medium of claim 16, wherein the instructions that when executed cause the at least one processor to identify the transformation comprise:

instructions that when executed cause the at least one processor to:

use a registration model to identify the registration error; and use a parallax model to identify the parallax error, the parallax model separate from the registration model.

20. The non-transitory machine readable medium of claim 16, wherein the transformation is based on one or more extrinsic parameters of the see-through camera, one or more extrinsic parameters of the display panel, and one or more extrinsic parameters of the virtual camera.

* * * * *